(12) United States Patent
Matsuura et al.

(10) Patent No.: US 6,182,782 B1
(45) Date of Patent: Feb. 6, 2001

(54) DEVICE FOR REDUCING THE IMPACT OF PEDESTRIANS

(75) Inventors: Yasuki Matsuura, Yokohama; Tetsuo Maki, Kanagawa, both of (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/339,942

(22) Filed: Jun. 25, 1999

(30) Foreign Application Priority Data

Jun. 26, 1998 (JP) .................................. 10-180958
Jun. 9, 1999 (JP) .................................. 11-163140

(51) Int. Cl.⁷ ......................... B60K 28/10; B60R 21/22
(52) U.S. Cl. ........................ 180/274; 280/730.1
(58) Field of Search ........................ 180/274, 271, 180/282; 280/728.1, 730.1, 743.1, 748, 751, 762

(56) References Cited

U.S. PATENT DOCUMENTS

| 3,709,316 | * | 1/1973 | Glance | 180/69 C |
|---|---|---|---|---|
| 3,829,140 | * | 8/1974 | Jehu et al. | 180/91 |
| 4,093,290 | * | 6/1978 | Pearson | 293/15 |
| 4,249,632 |  | 2/1981 | Lucchini et al. | 180/274 |
| 4,946,002 | * | 8/1990 | Vu et al. | 180/271 |

FOREIGN PATENT DOCUMENTS

| 2711338A1 | * | 9/1978 | (DE) | B60R/21/14 |
|---|---|---|---|---|
| 2841315A1 | * | 4/1980 | (DE) | B60R/21/14 |
| 7-108902 |  | 4/1995 | (DE) | B60R/21/34 |

* cited by examiner

*Primary Examiner*—Brian L. Johnson
*Assistant Examiner*—Joselynn Sliteris
(74) *Attorney, Agent, or Firm*—Foley & Lardner

(57) ABSTRACT

A device for reducing impact to a pedestrian involved in a collision with a motor vehicle includes a displacement mechanism to raise a hood from a rest position to an impact position elevated relative to the rest position, and an air bag module including an air bag. The air bag module is operative to inflate the air bag after displacement of the hood from the rest position to the impact position has begun. When inflated, the air bag has its first cushion portion extending beneath the hood and its second cushion portion extending out from the rear of the hood. The second cushion portion extends over a lower portion of a windshield of the vehicle.

21 Claims, 26 Drawing Sheets

FORWARD DIRECTION OF VEHICLE

LONGITUDINAL CENTERLINE OF VEHICLE

LONGITUDINAL CENTERLINE OF VEHICLE

LONGITUDINAL CENTERLINE OF VEHICLE

FORWARD DIRECTION OF VEHICLE

FORWARD DIRECTION OF VEHICLE

DEVICE FOR REDUCING THE IMPACT OF PEDESTRIANS

FIELD OF THE INVENTION

The present invention relates to a device for reducing the impact to pedestrians.

BACKGROUND OF THE INVENTION

U.S. Pat. No. 4,249,632 discloses a device for reducing the impact to pedestrians, which considerably reduces the magnitude of trauma to the head and upper body of a pedestrian. Such impact may occur upon striking the front hood of a motor vehicle during a collision. Referring to FIG. 29, discussion proceeds on this known device.

FIG. 29 illustrates a motor vehicle 1 equipped with this known device. In FIG. 29, a sensor 2 is suitably arranged in a zone of a front bumper bar of the vehicle 1 to detect a collision with a pedestrian. A front hood 3 can be pivoted around an essentially horizontally extending swivel pin placed at the front edge of the vehicle 1. The front hood 3 can be displaced by means of an air bag 5 that extends essentially across the entire width of the vehicle, so as to move it from a rest position indicated by one dot chain lines to an interception line indicated by full lines. In the rest position, the air bag 5 is folded and placed underneath the front hood 3, approximately in the zone under the cowl. The air bag can be inflated in the shortest possible time through a gas generator 4. The gas generator 4 may include a gas producing solid propellant charge that is ignited by means of the sensor 2 over a signal line.

JP-A 7-108902 discloses an air bag 5 that is inflated to extend over a front hood 3 of a vehicle 1. A sensor 2 is arranged in the zone of a front bumper bar of the vehicle 1. A gas generator 4 is placed underneath the front hood 3. When the gas generator 4 is activated by means of the sensor 2 upon a collision with a pedestrian, the air bag 5 is inflated, forming an impact buffer between the front hood 3 and the pedestrian.

Both of the devices are effective in reducing impact to the pedestrian's head upon detection of a collision. In the known devices, a pressurized gas is introduced into the air bag to inflate the bag to lift the front hood from the rest position to the interference position or to extend over the front hood. A large volume of gas is required, making it difficult to reduce the size of a gas generator. Thus, difficulty arises in placing the folded air bag and the gas generator underneath the front hood.

In the device according to JP-A 7-108902, the inflated air bag that extends over the front hood, creates an impact buffer upon detection of a collision with a pedestrian. When the pedestrian lands on the front hood during the collision, the head of the pedestrian, hit by the vehicle, contacts with the air bag. The stress of a direct impact to the head is the product of the magnitude of interference area through which the head contacts with the air bag and the magnitude of internal pressure of the air bag. The head is spherical so that the magnitude of stress, which the head is subject to, increases with the increasing magnitude of displacement. Thus, the air bag must have a considerable amount of vertical dimension to absorb the kinetic energy of the head. The air bag and the associated gas generator therefore become bulky, making it difficult to find installation space underneath the hood.

The art relating to reduction of impact to pedestrian is fairly well developed. However, a need remains for further development of such devices, especially in light of current movement to increased care of pedestrians involved in collision with a motor vehicle.

SUMMARY OF THE INVENTION

Accordingly, it is an object of the present invention to provide an impact reducing device, which is easy to mount to a motor vehicle.

It is a further object of the present invention to provide such an impact reducing device, which effectively reduces impact to a pedestrian involved in a collision with a motor vehicle.

According to one aspect of the present invention, there is provided a device for reducing impact to a pedestrian struck by a motor vehicle having a hood extending in a generally horizontal plane and covering a compartment in front of a windshield of the vehicle, comprising:

a displacement mechanism for the displacement of the hood from a rest position to a impact position raised relative to the rest position; and an air bag module including an air bag, said air bag module being operative in cooperation with said displacement mechanism to inflate the air bag, causing the air bag to have a first cushion portion extending beneath the rear of the hood across at most the entire width of the hood and a second cushion portion extending out from the rear of the hood.

According to another aspect of the present invention, there is provided a device for reducing impact to a pedestrian involved in interference with a motor vehicle, the motor vehicle having a hood extending in a generally horizontal plane and covering a compartment in front of a windshield of the vehicle, comprising:

means for generating a signal upon collision of a pedestrian with the motor vehicle;

means for displacing the hood from a rest position to a impact position raised relative to the rest position in response to said signal; and an air bag module under the hood, said air bag module including a gas generator and an inflatable air bag, said air bag module being operative in response to the displacement of the hood from the rest position to the impact position to admit gas to said air bag, inflating the air bag to deploy a first cushion portion beneath the rear of the hood across at most the entire width of the hood and to deploy a second cushion portion out from the rear of the hood to extend over the windshield.

According to still another aspect of the present invention, there is provided a process for reducing impact to a pedestrian involved in interference with a motor vehicle having a hood extending in a generally horizontal plane and covering a compartment in front of a windshield of the vehicle, comprising:

generating a signal upon collision of a pedestrian with the motor vehicle;

raising the hood from a rest position to a impact position in response to said signal; and inflating an air bag after the hood has been raised from the rest position to the impact position to deploy a first cushion portion beneath the rear of the hood across at most the entire width of the hood and to deploy a second cushion portion out from the rear of the hood to extend over the windshield.

Figure 1A:
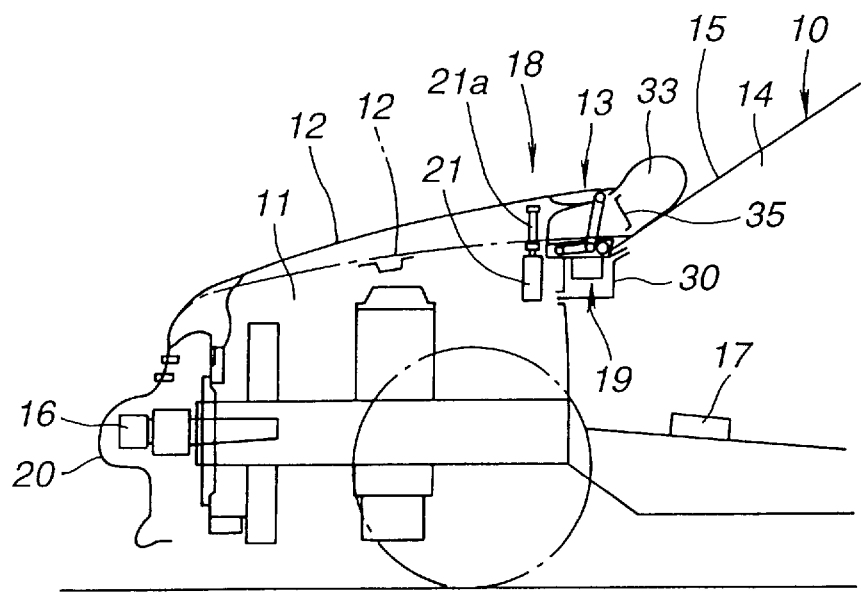
FIG. 1A illustrates diagrammatically, in a side elevation, a front portion of a motor vehicle equipped with a first embodiment of an impact reducing device with a hood at an elevated impact position.
Figure 1B:
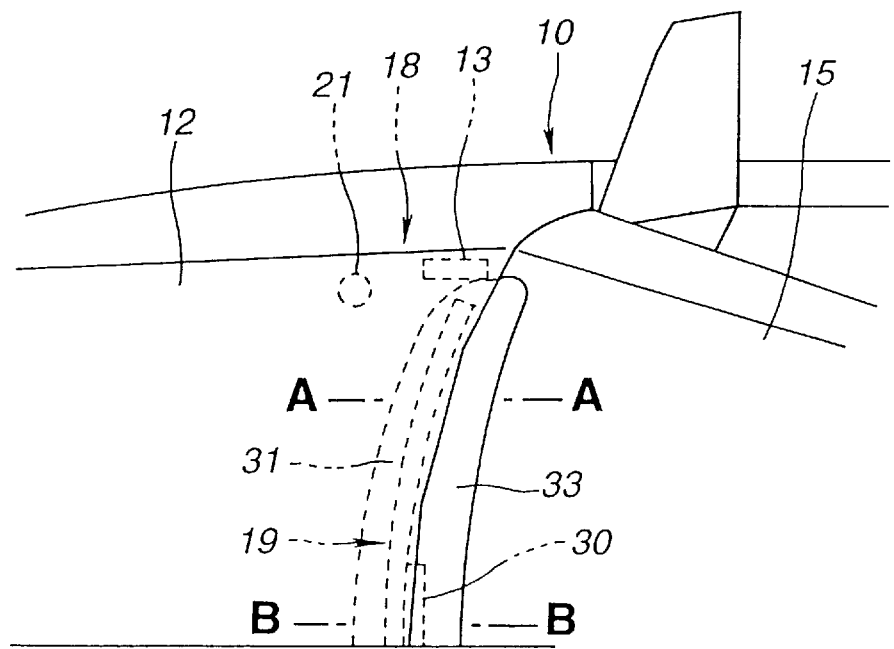
FIG. 1B illustrates, in a slightly magnified plan view, a portion of the motor vehicle shown in FIG. 1A.

DESCRIPTION OF THE PREFERRED EMBODIMENTS (First Embodiment)

Referring to FIGS. 1A to 4, the reference 10 designates a motor vehicle with a front engine compartment 11. A hood 12 is placed above the engine compartment 11. The hood 12 can be raised from a rest position to an impact position. The reference numeral 13 generally designates a pair of retainers to hold the hood 12 at the impact position. The pair of retainers 13 are mounted to the motor vehicle 10 at two mutually distant portions, which are laterally spaced from a longitudinal centerline of the motor vehicle 10 and disposed below rear lateral corners of the hood 12. The motor vehicle 10 has a cabin or a passenger compartment 14. A windshield 15 defines an upper portion of a front end of the cabin 14.

The hood 12 has a rear edge. The rear edge is disposed in the proximity of a lower end portion of the windshield 15 in a spaced relationship.

A sensor 16 is mounted to an inner side of a bumper 20 that defines the front end of the motor vehicle 10. The sensor 16 generates a sensor signal upon collision with a pedestrian.

A controller 17, within a front area of the cabin 14, receives the sensor signal and determines whether or not the hood 12 is to be raised to the impact position. Upon determination that the hood 12 is to be raised to the impact position and an air bag assembly 33 is to be inflated, the controller 17 sends an activation signal to a mechanism 18 to raise the hood 12.

Upon or immediately after the mechanism 18 has been activated, the controller 17 sends another activation signal to an air bag module 19.

Figure 5:
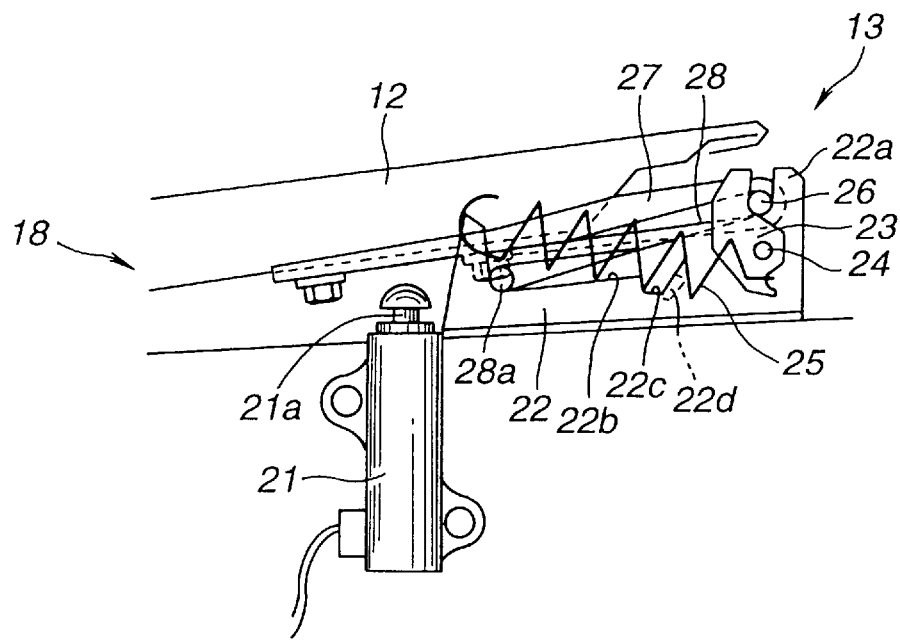
FIG. 5 illustrates diagrammatically, in side plan view, a mechanism, used in the first embodiment, to raise the hood to the impact position, the mechanism being in its rest position.
Figure 6:
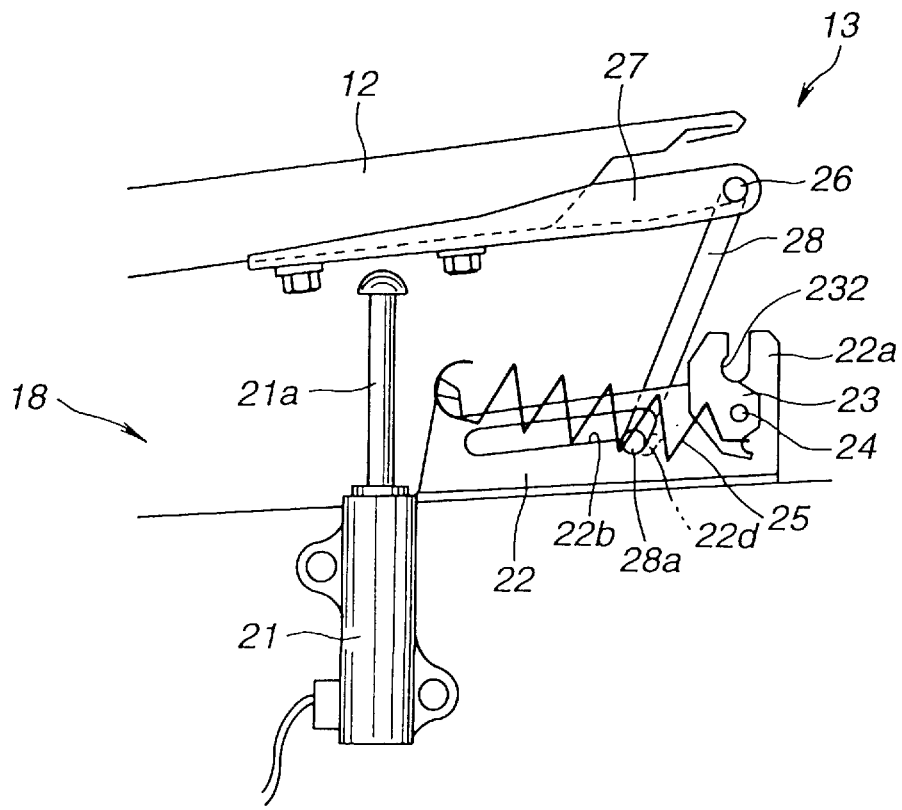
FIG. 6 illustrates the mechanism of FIG. 5 in its work position to support the hood in its raised impact position.

FIGS. 5 and 6 illustrate the mechanism 18 to raise the hood 12. Two actuators 21, in pair, are mounted below the hood 12 near lateral sides thereof, respectively. Each of the actuators 21 employs a piston mechanism containing highly pressurized gas or explosive. FIG. 5 illustrates the hood 12 in the rest position and the mechanism 18 in a standby position, while FIG. 6 illustrates the hood 12 in the impact position and the mechanism 18 in an activated position. In response to the activated signal, a piston 21a of each of the actuators 21 extends from a retracted standby position (see FIG. 5) to an extended activated position (see FIG. 6), pressing the rear portion of the hood 12 upwardly from the rest position to the impact position.

Apparently, the mechanism 18 is responsible for raising the hood 12 to the impact position, securing quick operation to raise the hood 12 to the impact position. Thus, a great volume of gas is no longer needed to inflate the air bag 33, allowing the use of a compact source of gas, making is easier to mount the air bag module 19 to the motor vehicle 10. The actuators 21 are arranged in symmetrical relation about the longitudinal centerline of the motor vehicle 10 to accomplish balanced symmetrical distribution of forces applied to the hood 12, assuring smooth and reliable motion of the hood 12 to the impact position. One may propose an appropriate arrangement to convert a drive generated by a single actuator to two force components applied to both lateral sides of a hood. The present mechanism incorporating two actuators is advantageous over this proposal because should one actuator fail, the other actuator would raise the hood.

The mechanism 18 includes the retainers 13. The retainers 13 hold the hood 12 in the impact position. The retainers 13 have bases 22 that are fixedly connected to the motor vehicle 10 at sites in the proximity of sides of the engine compartment 11, respectively. Each of the retainers 13 has a lock 23 mounted to the associated base 22 for a pivotal motion about a supporting pin 24. At a portion above the pin 24, the lock 23 is formed with a catch 232. At a portion below the pin 24, the lock 23 is engaged by one end of a spring 25 whose opposite end is anchored to the base 22. In the position of FIG. 5, one of a pair of hinge pins 26 is interposed and locked between the catch 232 of the lock 23 and an upper portion 22a of the base 22 under the action of the spring 25. The hinge pins 26 are fixed to leading ends of spaced supporting arms 27 of the hood 12, respectively. At base end portions, the arms 27 are fixedly connected to the hood 12 at left and right lateral edges of a rear portion thereof, respectively. Each of the hinge pins 26 has a middle link 28. At one end, the middle link 28 is mounted to the hinge pin 26 for rotation thereabout. At the other end portion, the middle link 28 has a guide pin 28a, which is inserted into an elongate guide opening 22b of the base 22.

In an ordinary state, each of the pair of hinge pins 26 is interposed between the associated catch 232 of one of the locks 23 and the upper portion 22a of the base 22. In the standby position as illustrated in FIG. 5, the hood 12 can rotate about the hinge pins 26. The pistons 21a of the pair of actuators 21 apply upward forces to the hood 12. Application of such upward forces causes the hinge pins 26 to rotate the locks 23 against the action of the springs 25. Rotation of the locks 23 against the springs 25 releases the hinge pins 26, allowing the rear portion of the hood 12 to lift toward the impact position of the hood 12 as illustrated in FIG. 6.

During this movement of the rear portion of the hood 12, the guide pins 28a of the middle links 28 slide along the elongate openings 22b, respectively, until they fall into engagement with recesses 22c. The recesses 22c are recessed from rear end portions of the elongate openings 22b, respectively. Pawls 22d are located at rearward portions of the recesses 22c, respectively. Upon or immediately after engagement of the guide pins 28a with the recesses 22c, the pawls 22d interfere with the middle links 28, respectively, thus preventing the hood 12 from being elevated beyond the impact position. Thus, the hood 12 will not interfere with inflation of the air bag assembly 33 since the actuators 21 elevates the hood 12 to the impact position that is limited by the mechanism 13.

Figure 2A:
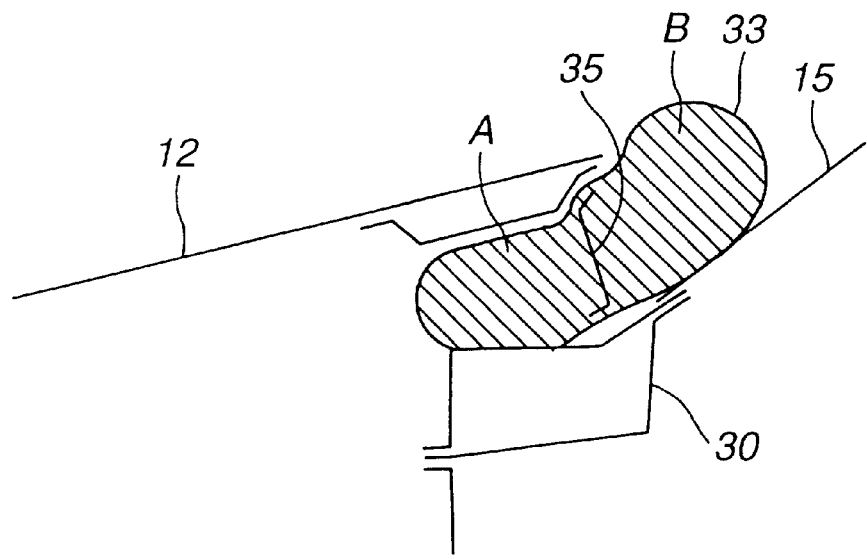
FIG. 2A is a cross section taken through the line A—A of FIG. 1B.
Figure 2B:
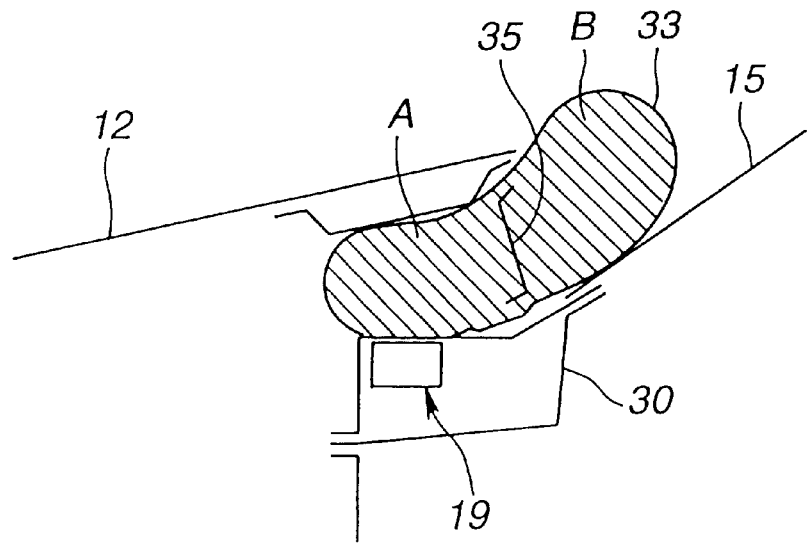
FIG. 2B is a cross section taken through the line B—B of FIG. 1B.
Figure 3:
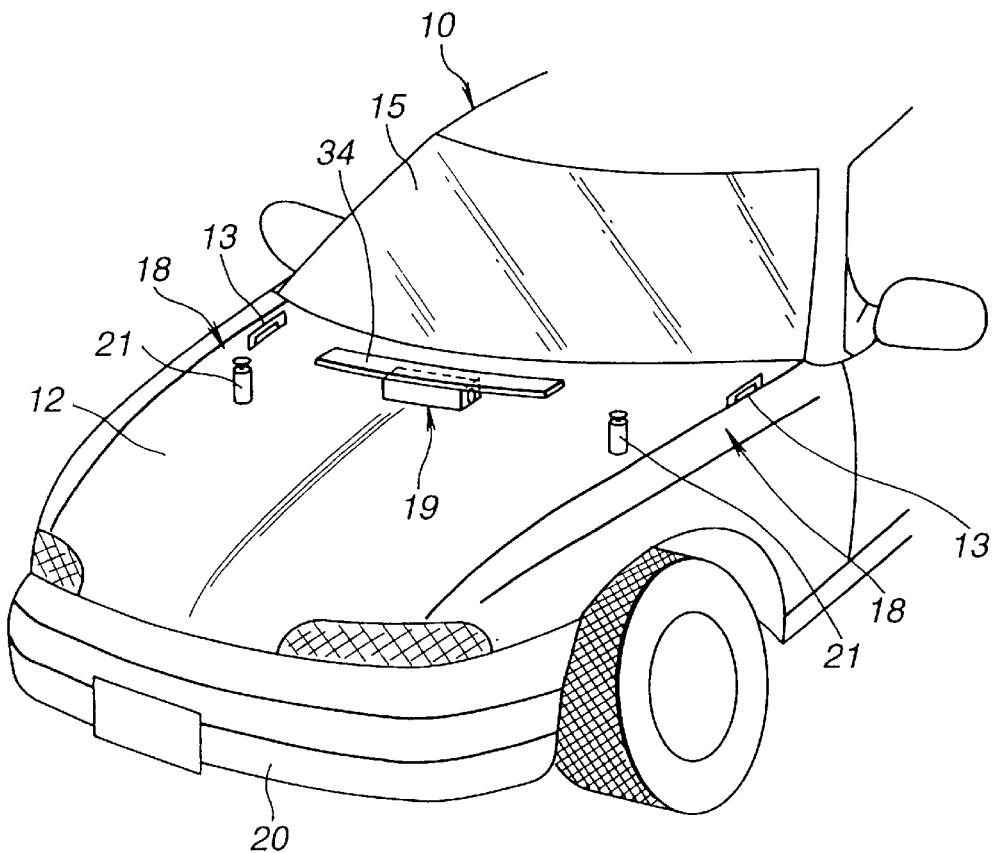
FIG. 3 illustrates diagrammatically, in a perspective view, a front portion of the motor equipped with the first embodiment of the impact reducing device in its normal rest position.
Figure 4:
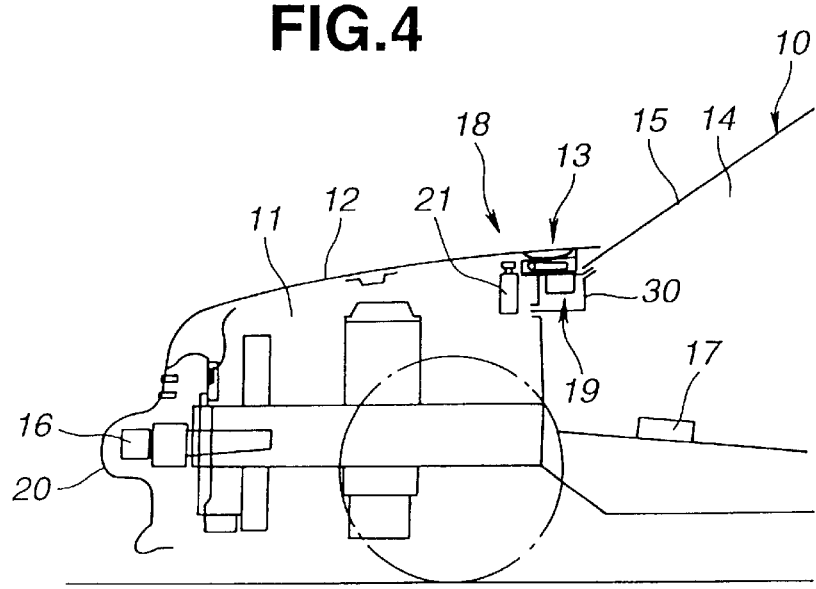
FIG. 4 illustrates diagrammatically, in a side elevation, the front portion of the motor vehicle equipped with the first embodiment of the impact reducing device in its normal rest position.
Figure 7:
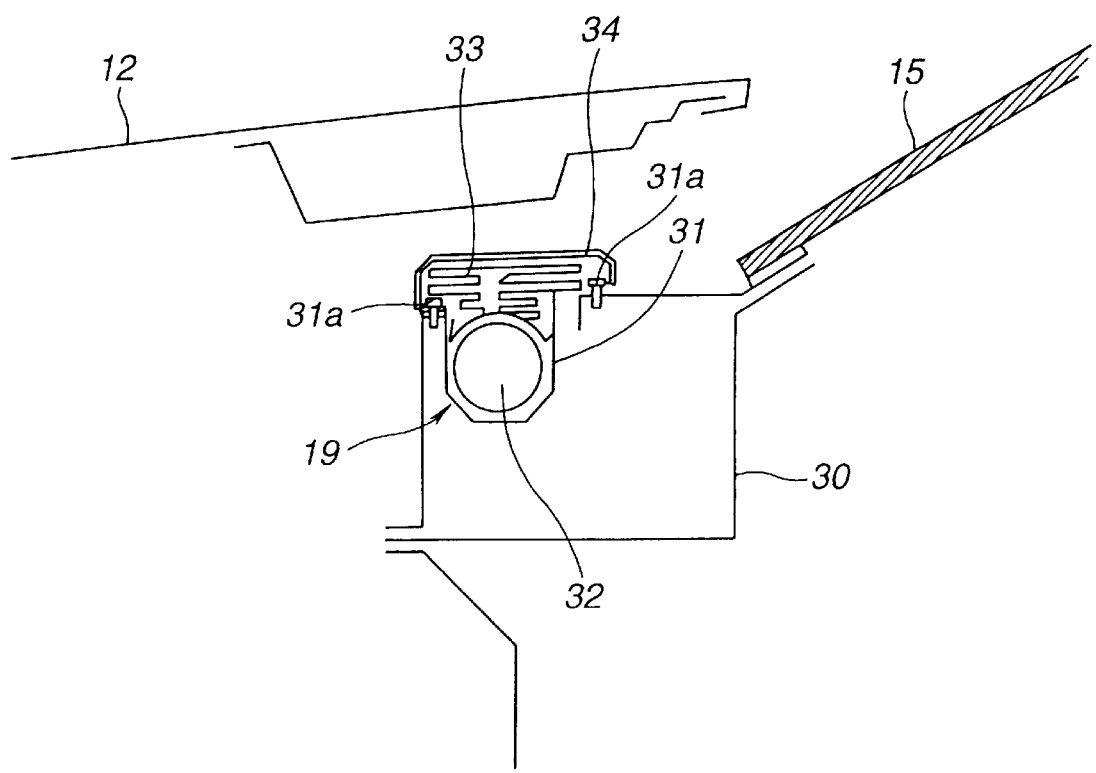
FIG. 7 illustrates diagrammatically an air bag module used in the first embodiment.

Referring to FIGS. 2A–2B and 7, an air bag module 19 is mounted, within an air box 30, beneath the rear portion of the hood 12. The air bag module 19 is elongated transversely with respect to the longitudinal centerline of the motor vehicle 10. As best seen in FIG. 7, the air bag module 19 includes a module case 31 and a gas generator 32. The module case 31 is fixed to the air box 30 by means of bolts 31a. The gas generator 32 is operative in response to a gas generator activation signal from the controller 17 to generate a great amount of gas. The gas is admitted via a gas inlet opening 33a (see FIG. 8A) into the air bag 33.

The module case 31 has an upper surface side open, which the gas inlet opening 33a is coupled with, such that the gas generated by the gas generator 32 flows into the air bag 33 via the gas inlet opening 33a. The gas inlet opening 33a communicates directly with a chamber A of the air bag 33. As best seen in FIGS. 2A and 2B, the chamber A is located beneath the rear portion of the hood 12 when the air bag 33 is inflated. Referring to FIG. 7, in its stored position, the air bag 33 is folded into a narrow band configuration. The folded air bag 33 is partially received in the module case 31. A module cover 34 conceals the air bag 33 disposed within the opening in the upper surface side of the module case 31. The module cover 34 is easily removed or broken into pieces upon inflation of the air bag 33.

When it is inflated, the air bag 33 extends transversely with respect to the longitudinal centerline along the rear edge of the hood 12 and has a first cushion portion defining the chamber A and a second cushion portion defining a chamber B. As readily seen from FIGS. 2A and 2B, the first cushion portion, which defines the chamber A, is disposed between the rear portion of the hood 12 and the air box 30. The second cushion portion, which defines the chamber B, projects rearwards from the rear edge of the hood 12 and extends over a lower portion of the windshield 15 (see FIGS. 2A–2B).

Figure 8A:
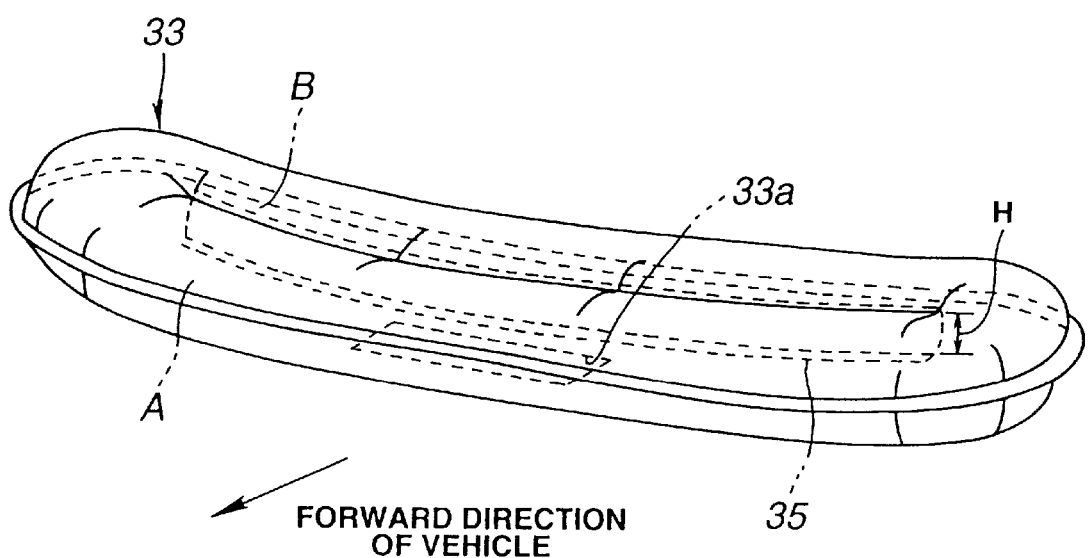
FIG. 8A illustrates, in a perspective view, an air bag in its inflated position.
Figure 8B:
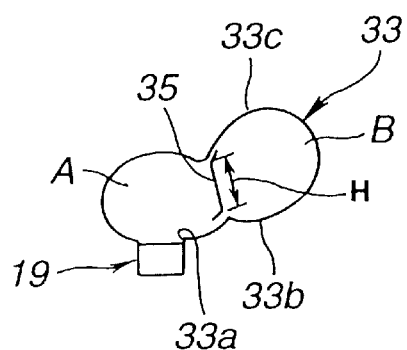
FIG. 8B is a cross section taken through a vertical plane oriented in a forward direction of the motor vehicle and bisecting the air bag in FIG. 8A, illustrating two chambers A and B.

As viewed in its inflated state as illustrated in FIGS. 8A and 8B, a restricting member, in the form of a partition wall 35, restricts the air bag 33 at a middle portion between two edges thereof spaced along the longitudinal centerline of the air bag 33. The restricting member in the form the partition wall 35 restricts vertical expansion of the middle portion to facilitate inflation of the air bag 33 within a limited period of time by a less volume of gas. In this example, the partition wall 35 restricts vertical distance, at the middle portion, between a lower wall portion 33b and an upper wall portion 33c of the air bag 33 beyond a maximum height (see FIGS. 8A and 8B). The partition wall 35 divides the interior of the air bag 33 into the two chambers A and B, but allows fluid communication between these chambers. The partition wall 35 has such a vertical dimension H that, when it is inflated, the air bag 33 is reduced in vertical dimension at the middle portion. The outer contour of the air bag 33 when inflated presents a constricted line along the middle portion where the partition wall 35 is located.

The partition wall 35 causes an increase in speed at which the air bag 33 is inflated in horizontal directions since the air bag 33 is less expanded in vertical direction at the middle portion than it is at the other portions. Particularly, in this example, the dimension H of the partition wall 35 is short enough to provide sufficiently high speed at which the air bag 33 is inflated in horizontal directions. The restriction member is not limited to the partition wall 35 that is provided at one portion of the air bag 33. The restriction member may be in the form of a string interconnecting the lower and upper portions of the air bag at the middle portion of the air bag.

The restriction member may include a plurality of partition walls or strings located at a plurality of portions of the air bags, respectively.

When the air bag 33 is inflated, the first cushion portion defining the chamber A extends transversely, with respect to the longitudinal centerline of the motor vehicle 10, over almost the whole area of lower surface of the rear portion of the hood 12. Under this condition, the second cushion portion defining the chamber B extends out in a rearward direction from the rear edge of the hood 12. The first and second cushion portion according to this first embodiment may be defined with respect to an imaginary transverse plane crossing the longitudinal centerline of the motor vehicle 10. When the air bag 33 is inflated, the first cushion portion disposed on the front side of this imaginary plane extends under the hood 12 and the second cushion portion disposed on the rear side of this imaginary plane extends out from the rear edge of the hood 12. The air bag 33 is constricted and has a bend at the middle portion that is in the proximity of this imaginary plane, thus making it easy for the first cushion portion to extend under the hood 12 and for the second cushion portion to extend out from the rear edge of the hood 12 and along the windshield 15.

The second cushion portion defining the chamber B of the air bag 33 extends from the rear edge of the hood 12 by substantially same amount over generally the whole length of the rear edge. The amount by which the second cushion portion extends from the rear edge of the hood 12 is determined to minimize influence on the driver's front view.

The quantity of explosive in the gas generator 33 is a main factor determining speed at which the air bag 33 is inflated. The air bag 33 must be inflated within a period of time from moment when a pedestrian strikes the motor vehicle 10 to moment when the pedestrian collides with the hood 12. Vehicle speed at which the motor vehicle 10 collides with the pedestrian determines the period of time. The quantity of explosive is determined as a predetermined function of the vehicle speed. Preferably, it is determined to cope with collision at the highest vehicle speed.

The volume of the air bag 33 is less than that of an air bag used in JP-A 7-108902 since the air bag is no longer required to extend the whole area of the hood 12, making it easier to mount to the motor vehicle. Particularly, according to this first embodiment, the air bag is no longer required to lift the hood 12 to the elevated impact position since the mechanism 18 performs this work. The gas generator 32 may be appreciably reduced in size because what is required is the capability of inflating the air bag for reduction in impact to a head of a pedestrian, making it easier to mount to the motor vehicle 10.

Figure 9A:
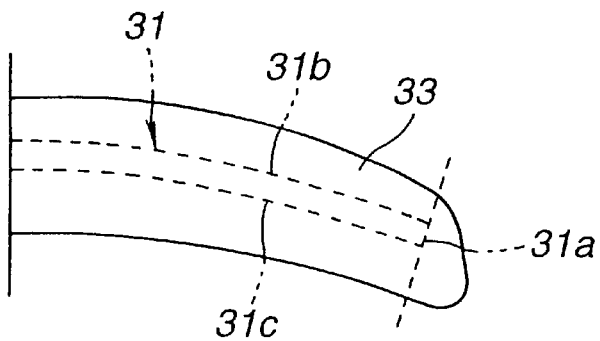
FIGS. 9A to 9E illustrate steps of folding the air bag.
Figure 9B:
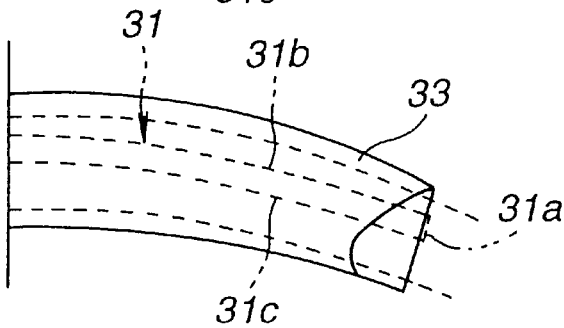
Figure 9C:
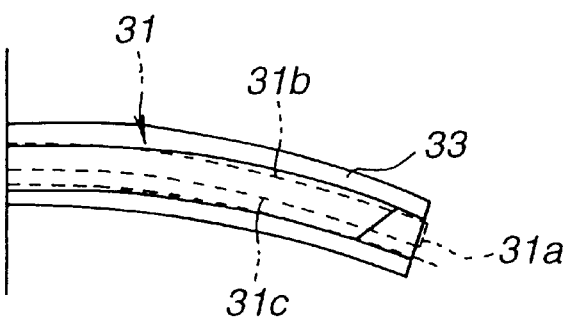
Figure 9D:
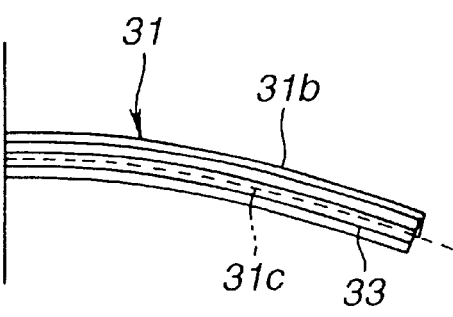
Figure 9E:
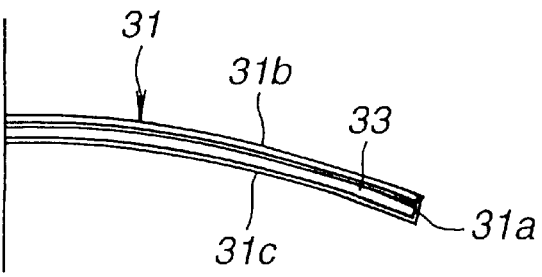

FIGS. 9A–9E illustrate steps of folding the air bag 33. In FIG. 9A, the module case 31 is indicated in broken line. The module case 31 has two spaced front and rear sides 31b and 31c interconnected by two spaced lateral ends, only one being shown by a broken line 31a. As shown in FIG. 9B, the air bag 33 has each of its lateral end portions folded in along the broken line 31a. Subsequently, portions of the air bag 33, which extend beyond the front and rear sides 31b and 31c of the module case 31, are folded in along broken lines parallel to the front and rear sides 31b and 31c several times as shown in FIGS. 9C and 9D. Finally, as shown in FIG. 9E, the folded air bag 33 is inserted into the module case 31 The broken lines indicate lines along which the air bag 33 is to be folded in.

Upon a collision between the motor vehicle 10 and a pedestrian, the sensor 16 generates a sensor signal. The sensor 16 applies the sensor signal to the controller 17. In response to the sensor signal, the controller 17 is operative to apply a mechanism activation signal to the mechanism 18 and then an air bag activation signal to the air bag module 19. Upon receiving the mechanism activation signal, the pair of actuators 21 of the mechanism 18 elevates the rear end portion of the hood 12 toward an elevated impact position. Upon receiving the air bag activation module, the gas generator 32 of the air bag module 19 inflates the air bag 33. The inflation of the air bag 33 is completed to accomplish an impact position before the pedestrian collides with the hood 12, thus coping with the secondary collision of the pedestrian with the hood 12.

In process, the first cushion portion defining the chamber A is inflated before inflation of the second cushion portion defining the second chamber B since gas from the gas generator 32 flows into the first chamber A via the gas inflow opening 33a directly communicating with the chamber A. The first cushion portion develops under the rear portion of the hood 12 and the second cushion portion develops along lower portion of the windshield 15. Thus, inflation of the air bag 33 under the hood 12 is completed before interference between the pedestrian and the hood 12 for the subsequent energy absorption. The air bag 33 is subjected to stress from the hood 12. During this energy absorption, area through which force is applied to the air bag 33 is constant, accomplishing a desired energy absorption characteristic. An increase in force applied to the air bag 33 causes pressure within the air bag 33 to tend to increase. This tendency is eliminated or at least reduced by displacing gas from the chamber A into the chamber B, suppressing an increase in reaction due to the increase in force applied to the air bag 33.

Figure 10A:
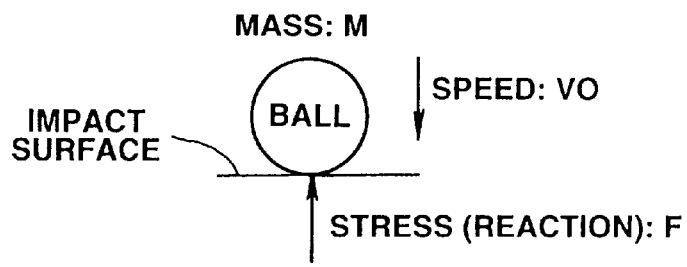
FIG. 10A illustrates diagrammatically a ball striking a surface of a hood or an air bag at a speed V0, the ball having a mass M.
Figure 10B:
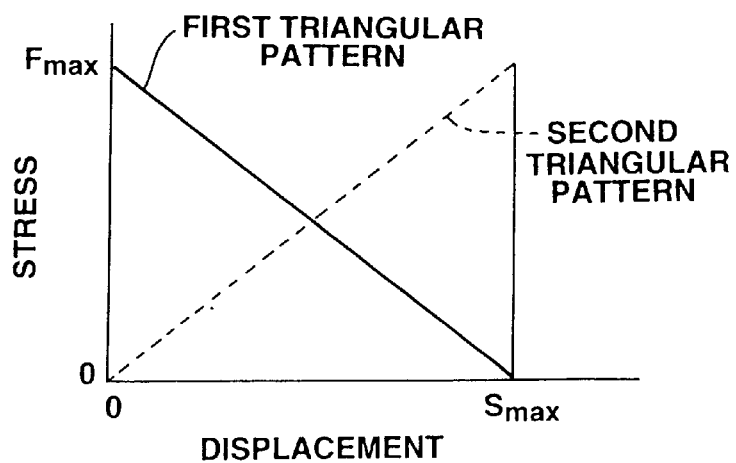
FIG. 10B illustrates diagrammatically a first triangular pattern (fully drawn line) of variation of stress, which the ball is subject to at the center of mass between an initial zero and final $S_{max}$ displacement interval and a second triangular pattern (dotted line) of variation of such stress.
Figure 10C:
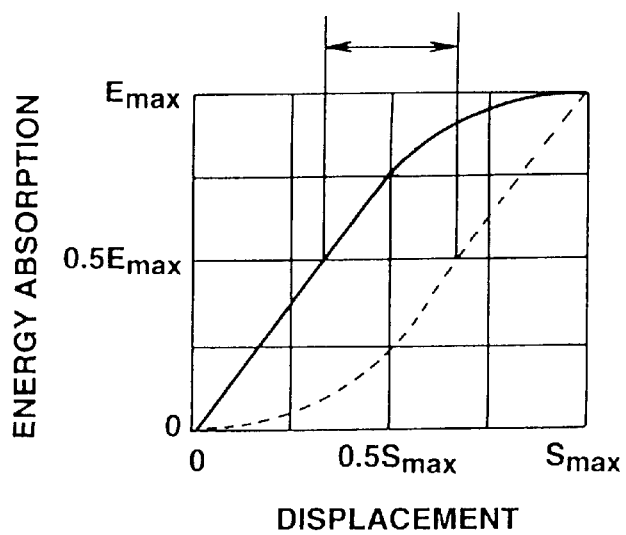
FIG. 10C illustrates, by the fully drawn line, the resultant energy absorption due to the first triangular pattern and, by the dotted line, the resultant energy absorption due to the second triangular pattern.

FIGS. 10A to 10C illustrate two typical patterns of variations of stress and energy absorption against variations of displacement. FIG. 10A illustrates a collision between a ball and an impact surface (a surface of hood 12 or a surface of air bag 33). The ball has a mass M and strikes the impact surface at a speed V0. The ball is subject to stress (or reaction) F from the impact surface. The collision may be evaluated by pattern of variations of stress F against variations of displacement (see FIG. 10B) and pattern of variations of energy absorption against variations of displacement (FIG. 10C). Available patterns of variations of stress against variations of displacement may be classified as a first triangular pattern with its peak of stress at initial stage of displacement or a second triangular pattern with its peak of stress at final stage of displacement. The fully drawn line in FIG. 10B illustrates the first triangular pattern. The broken line in FIG. 10B illustrates the second triangular pattern. The fully drawn line in FIG. 10C illustrates variations of energy absorption against variations of displacement due to the first triangular pattern. The broken line in FIG. 10C illustrates variations of energy absorption against variations of displacement due to the second triangular pattern. FIG. 10C shows that for absorption of a half of energy (0.5 $E_{max}$), the first triangular pattern requires less displacement than the second triangular pattern does. A double headed arrow in FIG. 10C shows a difference between a measure of displacement at which the half of energy is absorbed by the second triangular pattern and a measure of displacement by the first triangular pattern. This clearly proves the desirability of the first triangular pattern over the second triangular pattern.

Figure 11A:
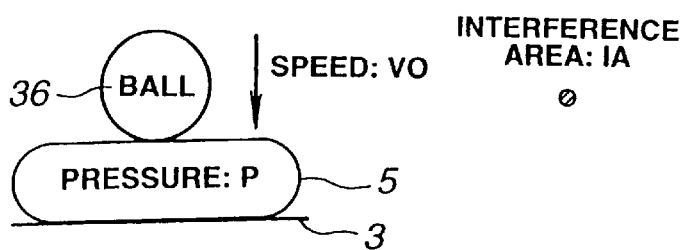
FIGS. 11A, 11B and 11C illustrate diagrammatically a ball striking the surface of an air bag in an initial stage, an intermediate stage and a final stage, respectively, with varying interference areas between the ball and the air bag.
Figure 11B:
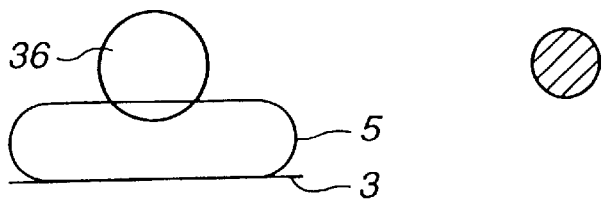
Figure 11C:
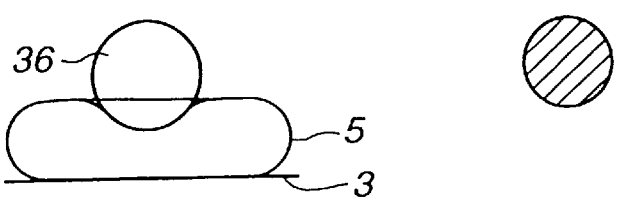
Figure 12:
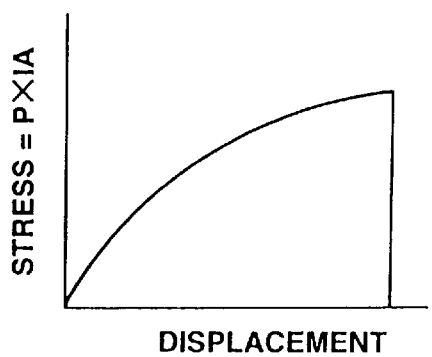
FIG. 12 illustrates diagrammatically the resultant variation of stress, which the ball is subject to at the center of mass during the collision of the ball with the air bag as illustrated in FIGS. 11A, 11B and 11C.
Figure 13A:
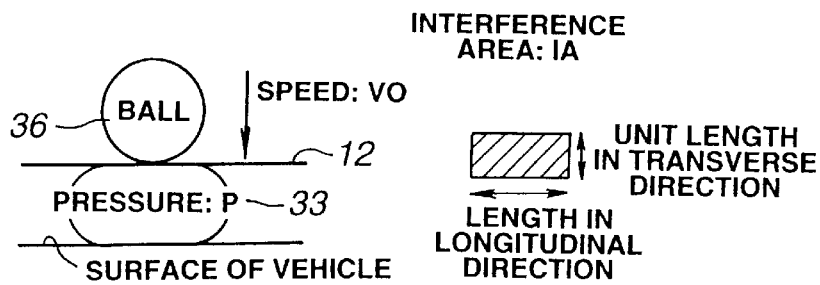
FIGS. 13A, 13B and 13C illustrate diagrammatically a ball striking the surface of a hood on an air bag in an initial stage, an intermediate stage and a final stage, respectively, with varying interference areas between the ball and the air bag.
Figure 13B:
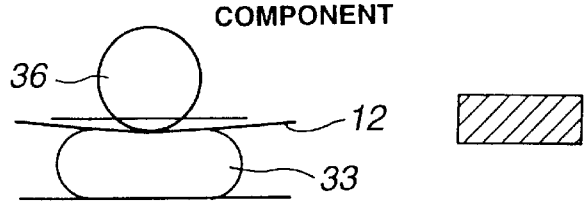
Figure 13C:
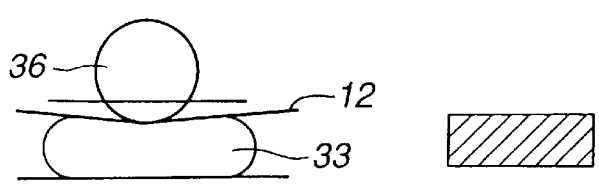
Figure 30:
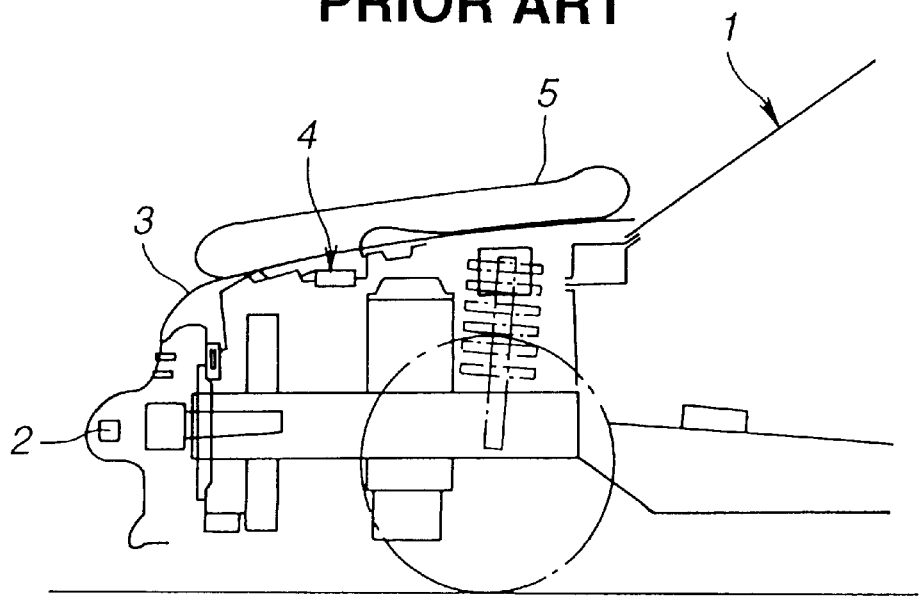
FIG. 30 illustrates diagrammatically a front portion of a motor vehicle equipped with the before discussed other known impact reducing device.

Referring next to FIGS. 11A–11C and 12, the impact reducing device as illustrated in FIG. 30 (prior art) is evaluated in terms of stress which a ball 36 is subject to when it strikes an air bag 5 directly. The air bag 5 extends over the whole area of a hood 3. The stress results from product of interference area and pressure P within the air bag 5. The interference area expands at an increasing rate in response to an increase in displacement as shown in FIGS. 11A–11C. Thus, the stress increases as the displacement increases in a pattern similar to the second triangular pattern as illustrated in FIG. 12.

Figure 14:
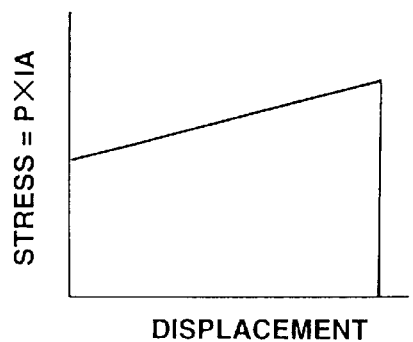
FIG. 14 illustrates diagrammatically the resultant variation of stress, which the ball is subject to at the center of mass during the collision of the ball with the hood as illustrated in FIGS. 13A, 13B and 13C.

The stress versus displacement mechanism employed by the preferred embodiment is explained. Referring to FIGS. 13A–13C and 14, the arrangement, wherein an air bag 33 is compressed between a hood 12 and the structural components when a ball 36 strikes the hood 12, is evaluated in terms of a stress component which the air bag 33 applies to the ball 36. The hood 12 possesses a certain degree of rigidity The interference area with the air bag 33, which may be expressed by the product (transverse length)× (longitudinal length), expands at a gradual rate in response to an increase in displacement. Thus, the stress component, which the ball 36 is subject to, increases at a gradual rate in response to an increase in displacement in a square pattern as illustrated in FIG. 14.

Figure 15:
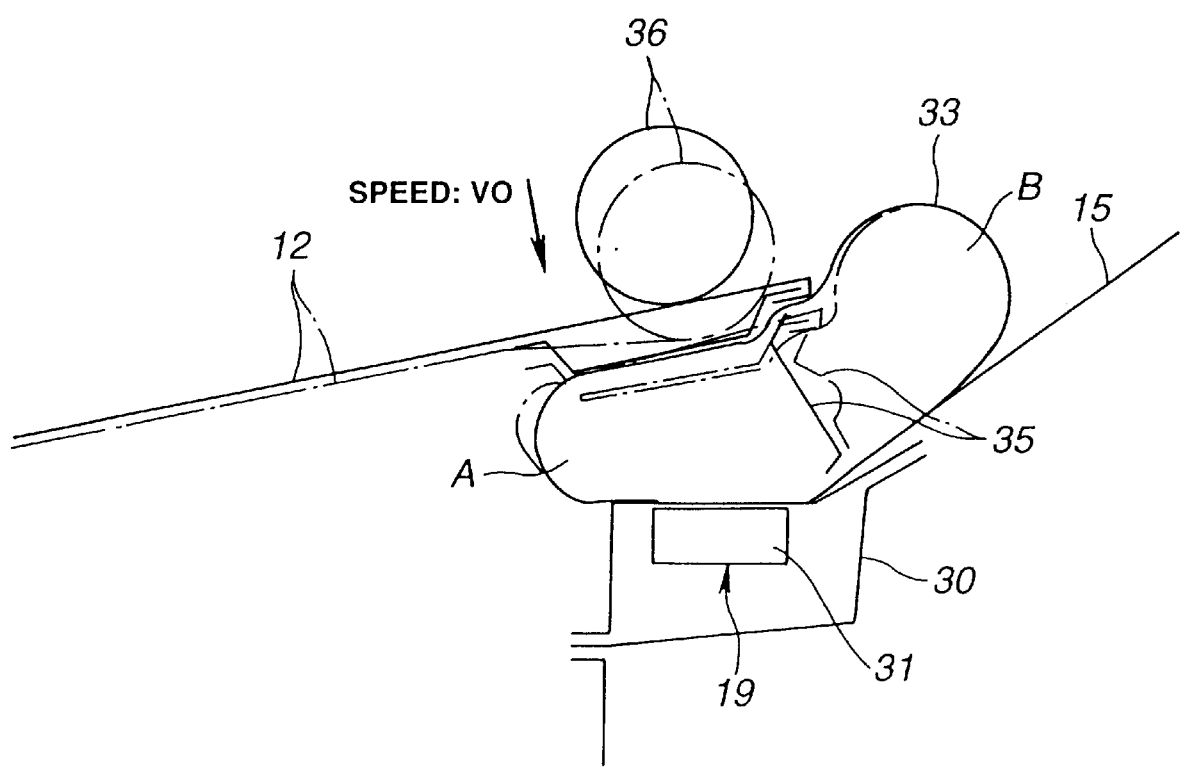
FIG. 15 illustrates diagrammatically, by the fully drawn line, the hood and inflated air bag in an initial stage of collision of the ball with the hood and, by the one-dot chain line, the hood and the air bag in a final stage of the collision.

FIG. 15 shows in the fully drawn line the initial stage position of parts of the impact reducing device when a ball 36 strikes the rear portion of the hood 12. The phantom line in FIG. 15 shows the final stage position of the parts of the impact reducing device after the ball 36 has struck the hood 12. As is seen from FIG. 15, the air bag 33 is underneath the hood 12 and the air box 30 or other components within the engine compartment are underneath the air bag 33. The air bag 33 extends, across the entire width of the hood 12, underneath the rear portion thereof in contact therewith, thus providing the same impact absorbing performance at any point in the rear portion over the entire width of the hood 12.

Figure 16:
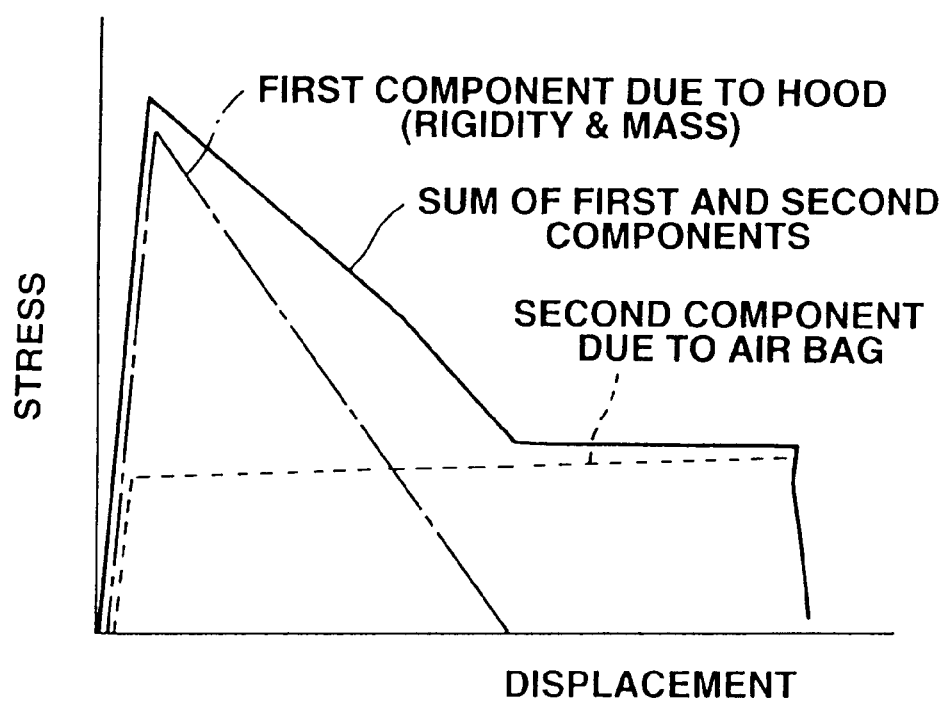
FIG. 16 illustrates, by dotted line, variation of one stress component due to the air bag, by one-dot chain line, variation of other stress component due to the hood, and, by the fully drawn line, the resultant variation of stress between an initial and final displacement interval.

FIG. 16 illustrates in broken line the stress component due to the air bag 33 as explained before in connection with FIG. 14. In FIG. 16, the one-dot chain line illustrates a stress component due to mass and rigidity of the hod 12. The fully drawn line illustrates resultant stress of the two stress components. The resultant stress, which the ball 36 is subject to, varies against variations in displacement in a pattern similar to the first triangular pattern that is considered to be appropriate for impact absorption during collision with a pedestrian.

When the air bag 33 is inflated, the second cushion portion defining the chamber B extends across the entire width of the lower portion of the windshield 15, providing impact absorption within area in the proximity of the lower portion of the windshield 15.

(Second Embodiment)

Figure 17:
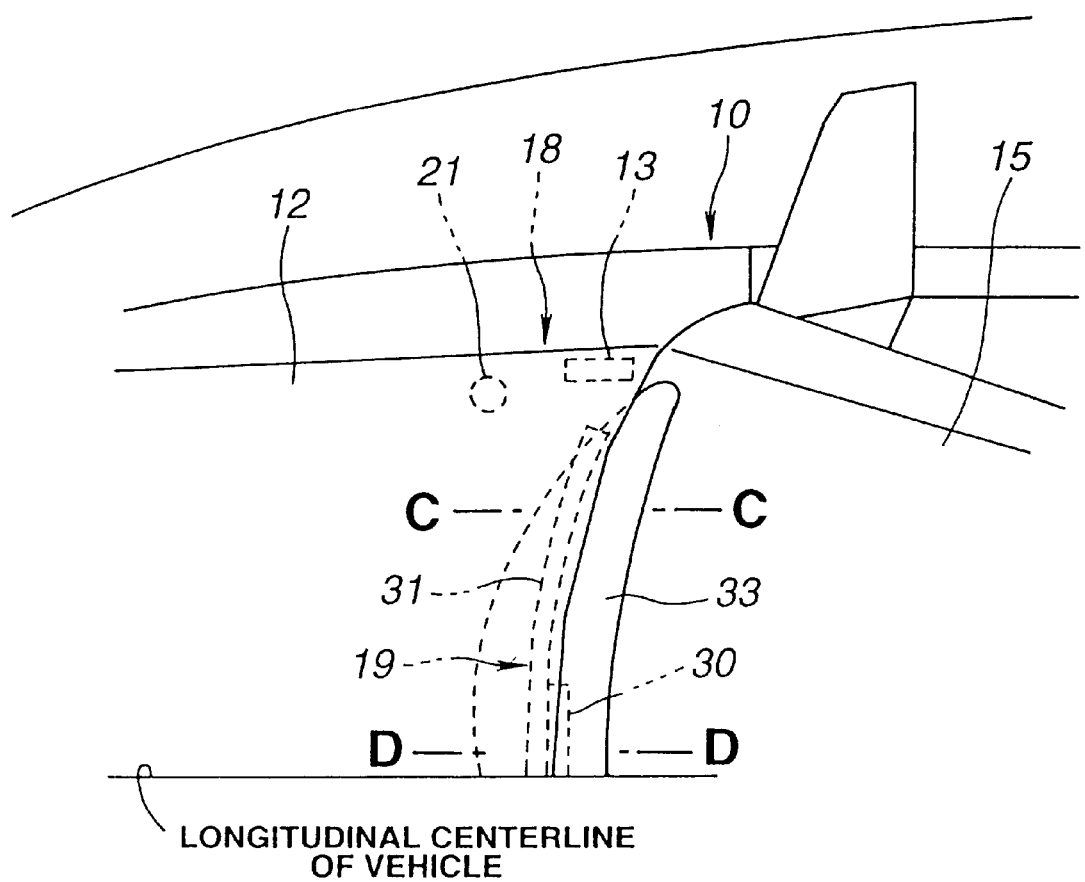
FIG. 17 illustrates diagrammatically, in a plan view, a front right half portion of a motor vehicle equipped with a second embodiment of an impact reducing device.
Figure 18A:
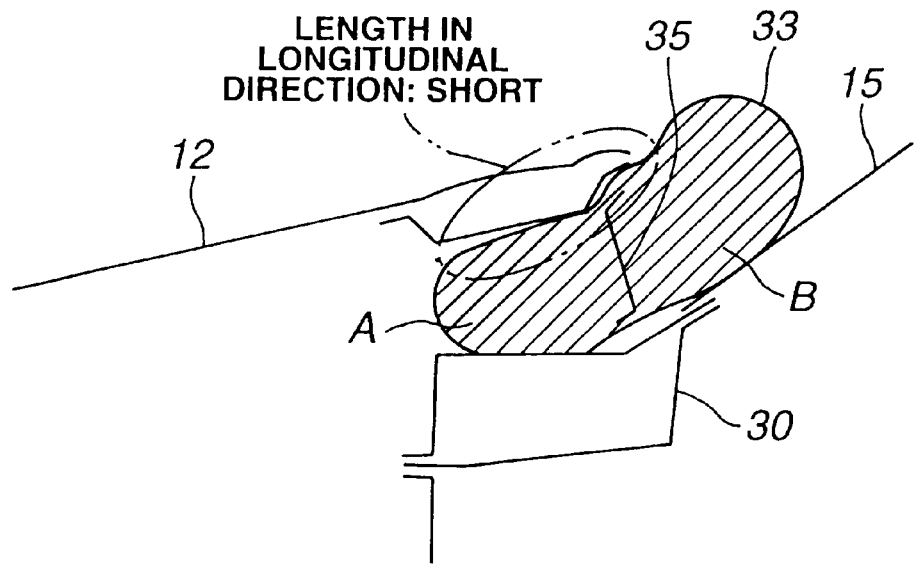
FIG. 18A is a cross section taken through the line C—C of FIG. 17.
Figure 18B:
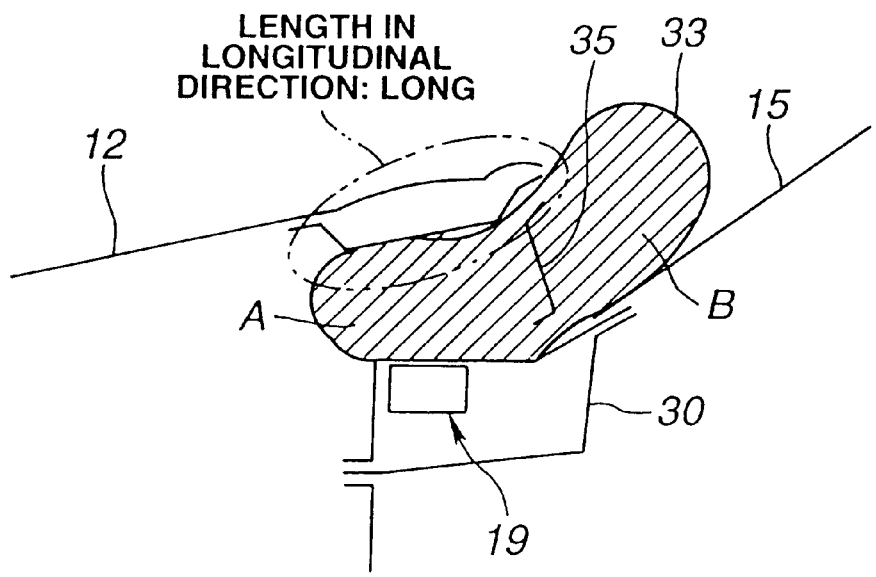
FIG. 18B is a cross section taken through the line D—D of FIG. 17.

Referring to FIGS. 17, 18A and 18B, this second embodiment is substantially the same as the first embodiment except the dimension of a first cushion portion defining a chamber A of an air bag 33. According to this second embodiment, the first cushion portion of the air bag 33 extends underneath a hood 12 less in a forward direction of a motor vehicle towards lateral sides of the hood 12.

Figure 19:
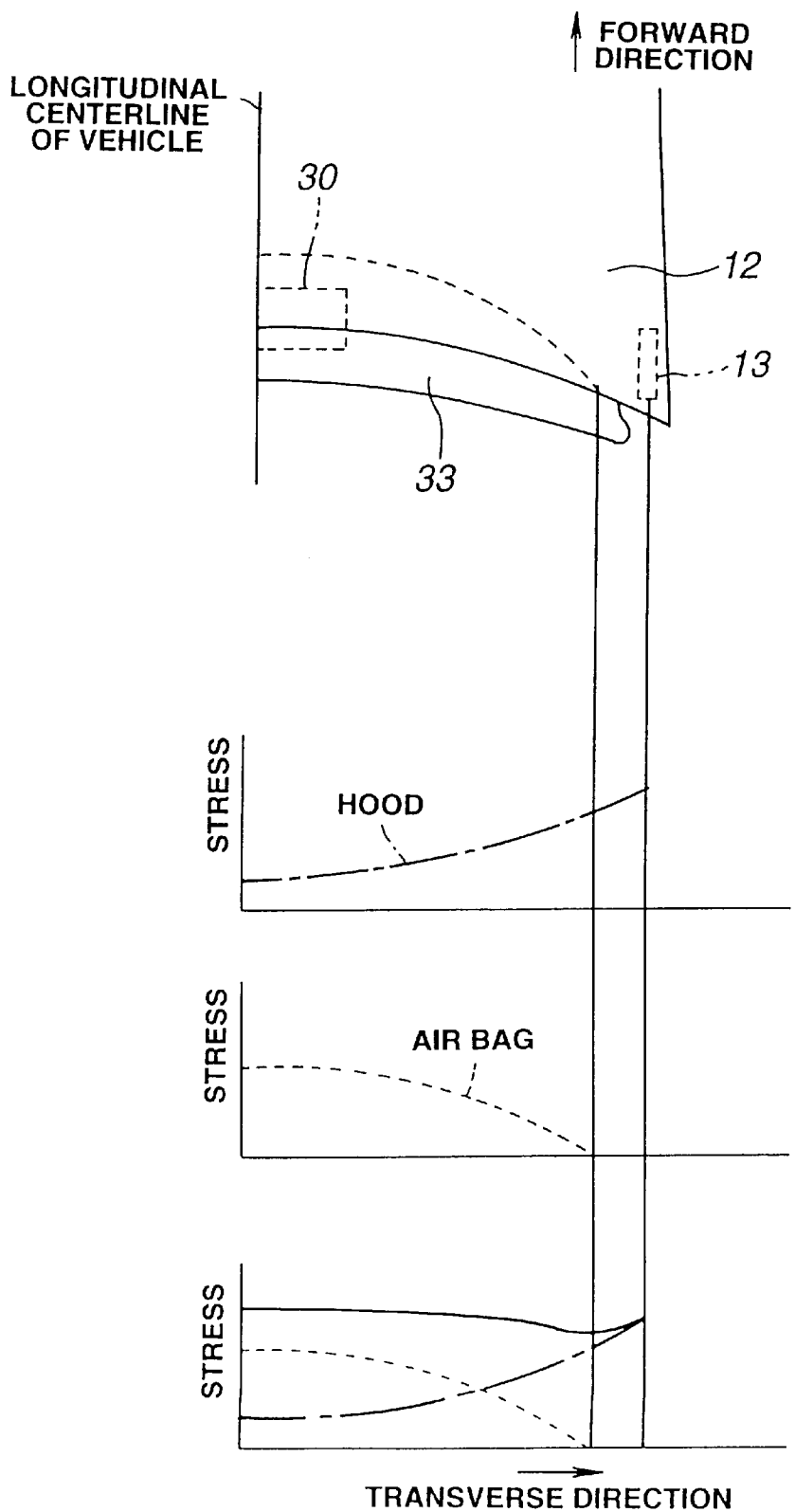
FIG. 19 illustrates diagrammatically variations of stress components due to a hood and an air bag and the resultant variation of stress at positions in transverse direction from a longitudinal centerline of the motor vehicle to a right-hand lateral side of the hood shown in FIG. 17.
Figure 20:
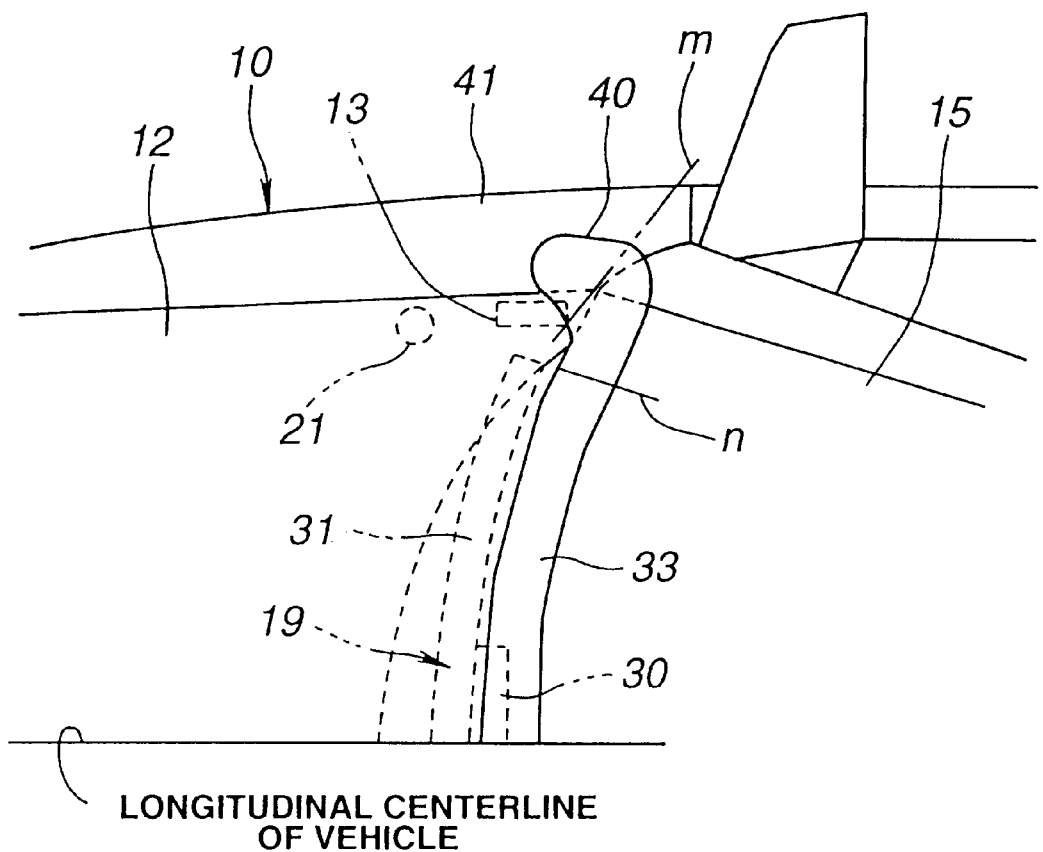
FIG. 20 illustrates diagrammatically, in a plan view, a front right half portion of a motor vehicle equipped with a third embodiment of an impact reducing device.
Figure 21:
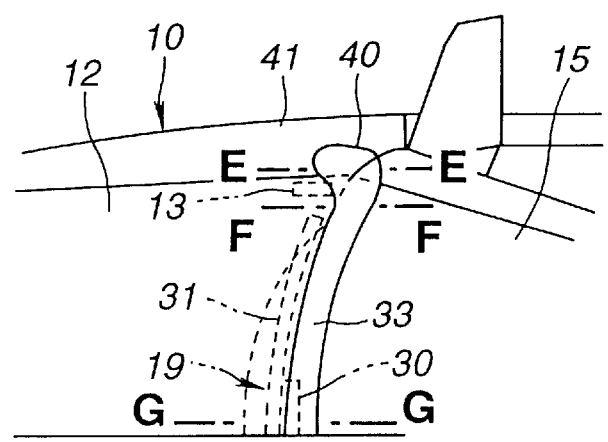
FIG. 21 is a slightly reduced view of FIG. 20.
Figures 22A, 22B, 22C:
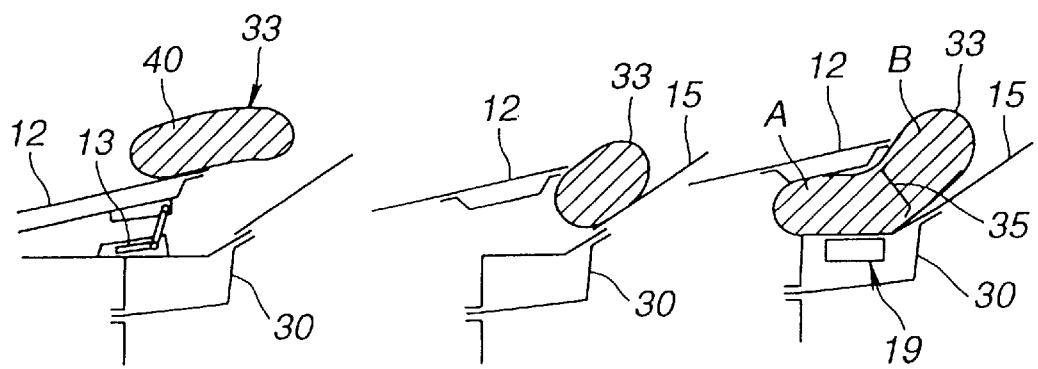
FIG. 22A is a cross section taken through the line E—E of FIG. 21.
FIG. 22B is a cross section taken through the line F—F of FIG. 21.
FIG. 22C is a cross section taken through the line G—G of FIG. 21.

Distribution of stress over the entire width of a motor vehicle 10 due to the hood 12 itself is such that the magnitude of stress increases toward each of the lateral sides of the hood 12 as illustrated by the one-dot chain line in FIG. 19. This is because, at two lateral side portions, the hood 12 is supported by mechanisms 8 to elevate the hood 12 to its impact position.

Distribution of stress over the entire width of the motor vehicle 10 due to the air bag 33 itself is such that the magnitude of stress decreases toward each of the lateral sides of the hood 12 as illustrated by broken line in FIG. 19. This is because the interference area between the hood 12 and the air bag 33 decreases toward each of the lateral sides of the hood 12.

Resultant stress of the stress component due to the hood 12 and the stress component due to the air bag 33 is generally unaltered, in magnitude, over the entire width of the motor vehicle 10 as illustrated by the fully drawn line in FIG. 19.

The one-dot chain line curve in FIG. 19 clearly shows that vertical strength is the weakest at a middle portion of the hood 12 that lay on the centerline of the motor vehicle 10.

The vertical strength at the middle portion 10 of the hood 12 may be increased by extending the first cushion portion of the air bag 33 more in the forward direction, thus making it possible to increase the vertical strength without any mechanical reinforcement (Third Embodiment)

Referring to FIGS. 20, 21 and 22A–22C, this third embodiment is substantially the same as the second embodiment except the configuration of a second cushion portion defining a chamber B of an air bag 33. According to this third embodiment, when the air bag 33 is inflated, the second cushion portion of the air bag 33 has protrusions 40 from its lateral ends, respectively. The protrusions 40 extend in forward direction over rear portions of front fenders 41 between which a hood 12 is disposed.

Figure 23A:
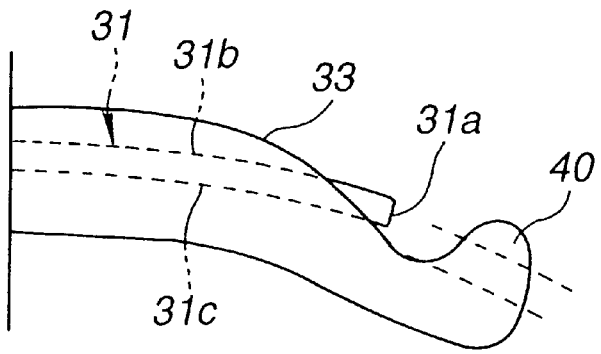
FIGS. 23A to 23D illustrate steps of folding the air bag used in the third embodiment.
Figure 23B:
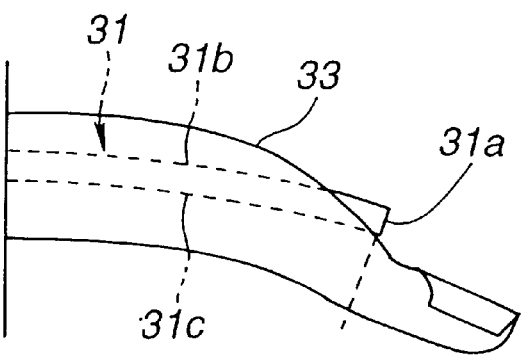
Figure 23C:
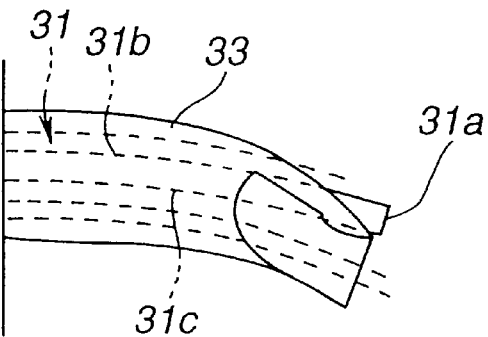
Figure 23D:
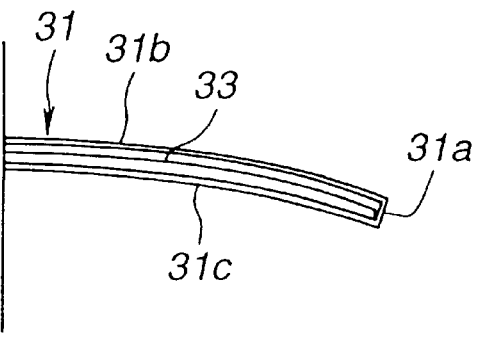
Figure 24:
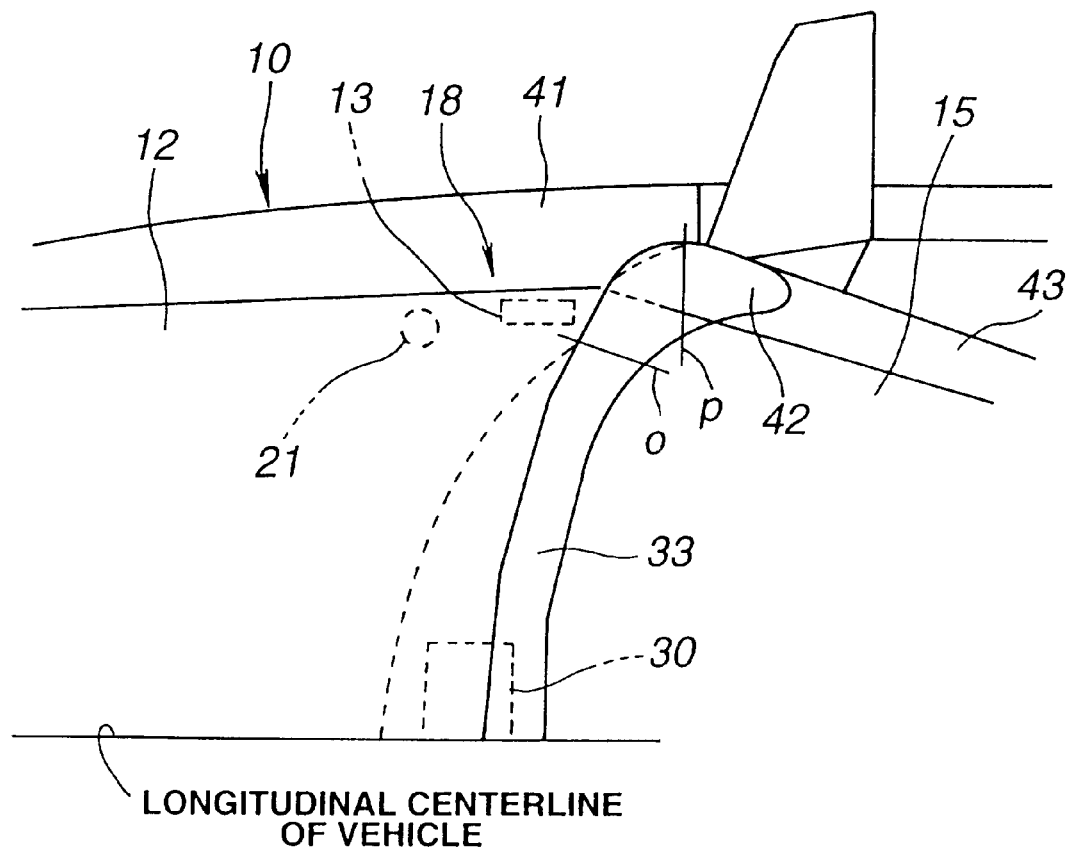
FIG. 24 illustrates diagrammatically, in a plan view, a front right half portion of a motor vehicle equipped with a fourth embodiment of an impact reducing device.
Figure 25:
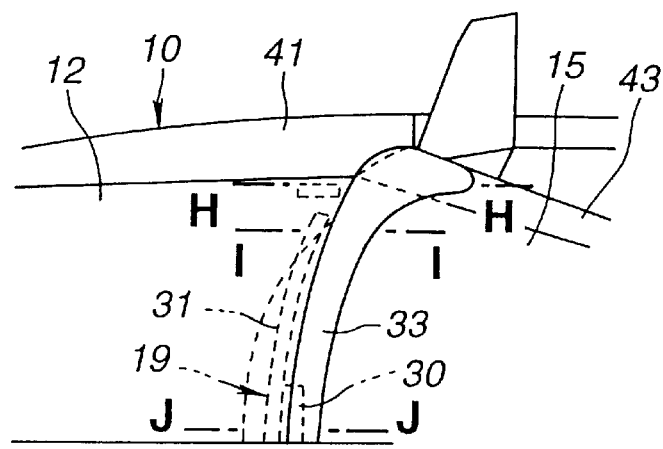
FIG. 25 is a slightly reduced view of FIG. 24.

FIGS. 23A–23D illustrate steps of folding the air bag 33 according to the third embodiment. In FIG. 23A, two parallel folded lines about which the protrusion 40 is to be folded are indicated in broken line. The protrusion 40 is folded as shown in FIG. 23B. Subsequently, as shown in FIG. 9B, the air bag 33 has each of its lateral end portions folded in along a broken line 31a. Portions of the air bag 33, which extend beyond front and rear sides 31b and 31c of a module case 31, are folded in along broken lines parallel to the front and rear sides 31b and 31c several times. Finally, as shown in FIG. 23D, the folded air bag 33 is inserted into the module case 31. The broken lines indicate lines along which the air bag 33 is to be folded in.

Referring back to FIGS. 20, 21 and 22A–22C, in process of inflating the air bag 33, after inflation of the first cushion portion defining a chamber A has begun, the middle section of the second cushion portion defining a chamber B is inflated (see FIG. 22C). After inflation of the middle section of the second cushion portion has begun, each of the lateral end portions are unfolded laterally about a line n (see FIG. 20B), and then the protrusion 40 of each lateral end portion is unfolded forwardly about a line m (see FIG. 20A). The protrusions 40 extend over rear end portions of the front fenders 41 for enhanced energy absorption there. When inflated, the protrusions 40 extend over retainers 13 which are mounted under the hood 12, thus effectively reducing impact to a pedestrian.

(Fourth Embodiment)

Referring to FIGS. 24, 25 and 26A–26C, this fourth embodiment is substantially the same as the second embodiment except the configuration of a second cushion portion defining a chamber B of an air bag 33. According to this fourth embodiment, when the air bag 33 is inflated, the second cushion portion of the air bag 33 has protrusions 42 from its lateral ends, respectively. The protrusions 42 extend in rearward direction over lower portions of front pillars 43 between which a windshield 15 is disposed. In this embodiment, the protrusions 42 are folded in the same manner as the protrusions 40 of the third embodiment are folded.

Figures 26A, 26B, 26C:
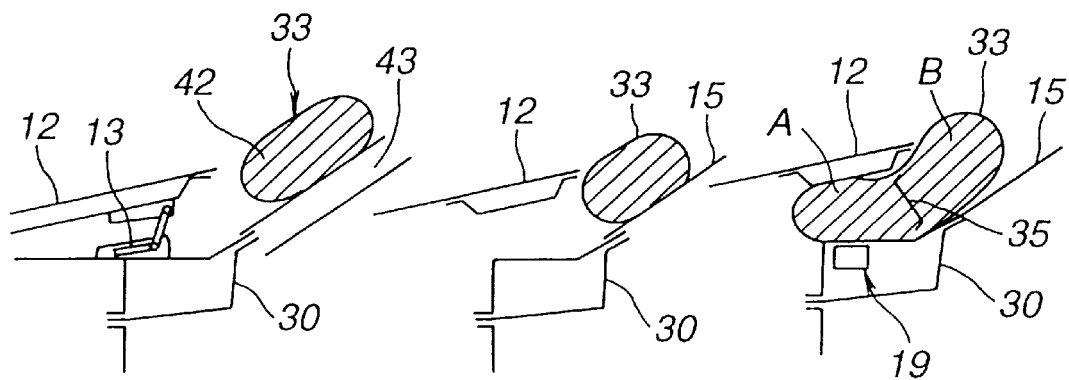
FIG. 26A is a cross section taken through the line H—H of FIG. 25.
FIG. 26B is a cross section taken through the line I—I of FIG. 25.
FIG. 26C is a cross section taken through the line J—J of FIG. 25.
Figure 27:
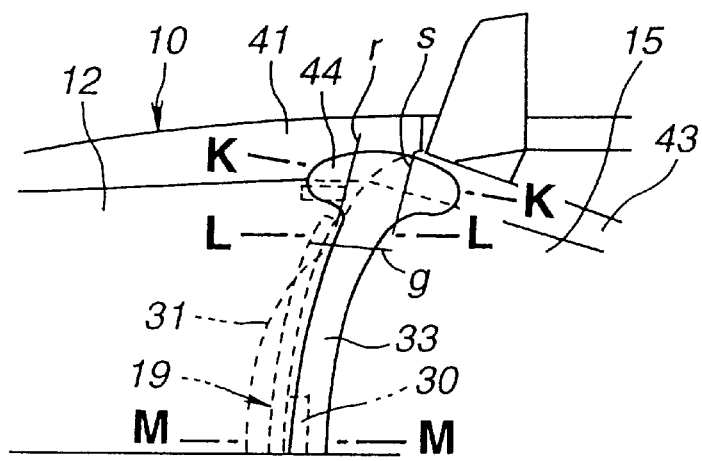
FIG. 27 illustrates diagrammatically, in a plan view, a front right half portion of a motor vehicle equipped with a fifth embodiment of an impact reducing device.

Referring to FIGS. 24, 25 and 26A–26C, in process of inflating the air bag 33, after inflation of the first cushion portion defining a chamber A has begun, the middle section of the second cushion portion defining a chamber B is inflated (see FIG. 26C). After inflation of the middle section of the second cushion portion has begun, each of the lateral end portions are unfolded laterally about a line o (see FIG. 24), and then the protrusion 42 of each lateral end portion is unfolded rearwardly about a line p (see FIG. 24). The protrusions 42 extend over the lower portions of the front pillars 43 for enhanced energy absorption there. When inflated, the protrusions 42 extend over lower portions of front pillars 43 thus effectively reducing impact to a pedestrian, (Fifth Embodiment)

Referring to FIGS. 27 and 28A–28C, this fifth embodiment is substantially the same as the second embodiment except the configuration of a second cushion portion defining a chamber B of an air bag 33. According to this fifth embodiment, when the air bag 33 is inflated, the second cushion portion of the air bag 33 has protrusions 44 from its lateral ends, respectively. The protrusions 44 extend in forward direction over rear portions of front fenders 41 between which a hood 12 is disposed and also in rearward direction over lower portions of front pillars 43 between which a windshield 15 is disposed.

Figures 28A, 28B, 28C:
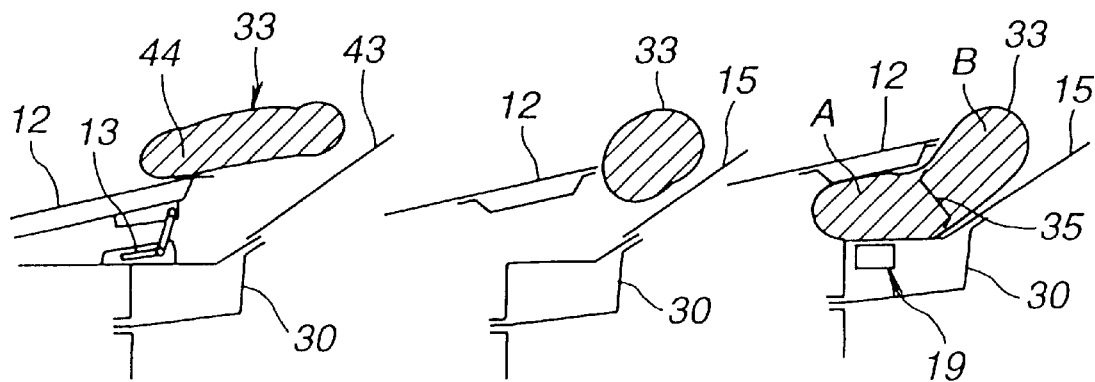
FIG. 28A is a cross section taken through the line K-K of FIG. 27.
FIG. 28B is a cross section taken through the line L-L of FIG. 27.
FIG. 28C is a cross section taken through the line M-M of FIG. 27.
Figure 29:
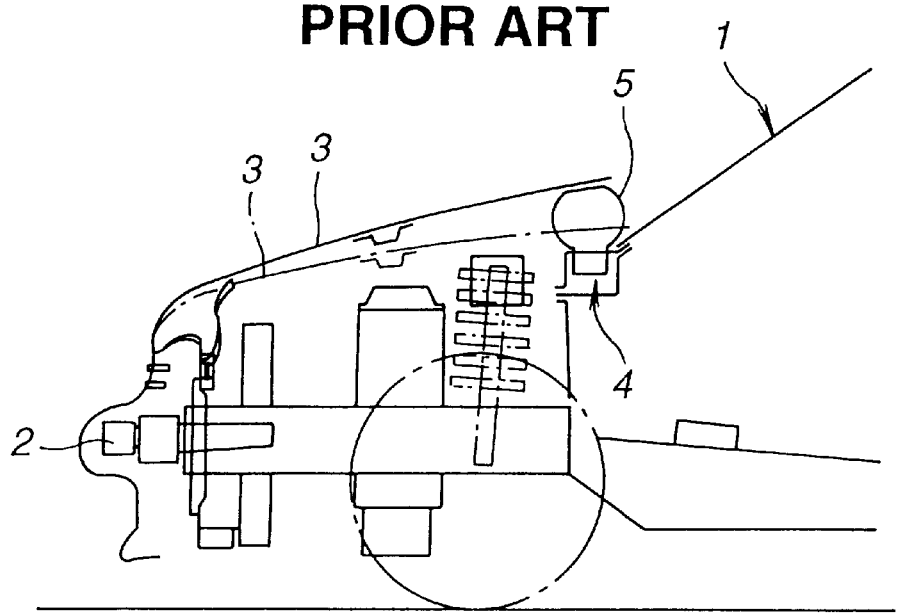
FIG. 29 illustrates diagrammatically a front portion of a motor vehicle equipped with the before discussed known impact reducing device.

Referring to FIGS. 27 and 28A–28C, in process of inflating the air bag 33, after inflation of the first cushion portion defining a chamber A has begun, the middle section of the second cushion portion defining a chamber B is inflated (see FIG. 28C). After inflation of the middle section of the second cushion portion has begun, each of the lateral end portions are unfolded laterally about a line g (see FIG. 28B), and then the protrusion 44 of each lateral end portion is unfolded forwardly about a line r and rearwardly about a line s (see FIG. 28A). The protrusions 44 extend over the rear portions of the front fenders 41 and the lower portions of the front pillars 43 for enhanced energy absorption there.

The second cushion portion of the air bag 33 may be modified to extend over other portions of the vehicle body where energy absorption is desired.

(Sixth Embodiment)

Figure 31:
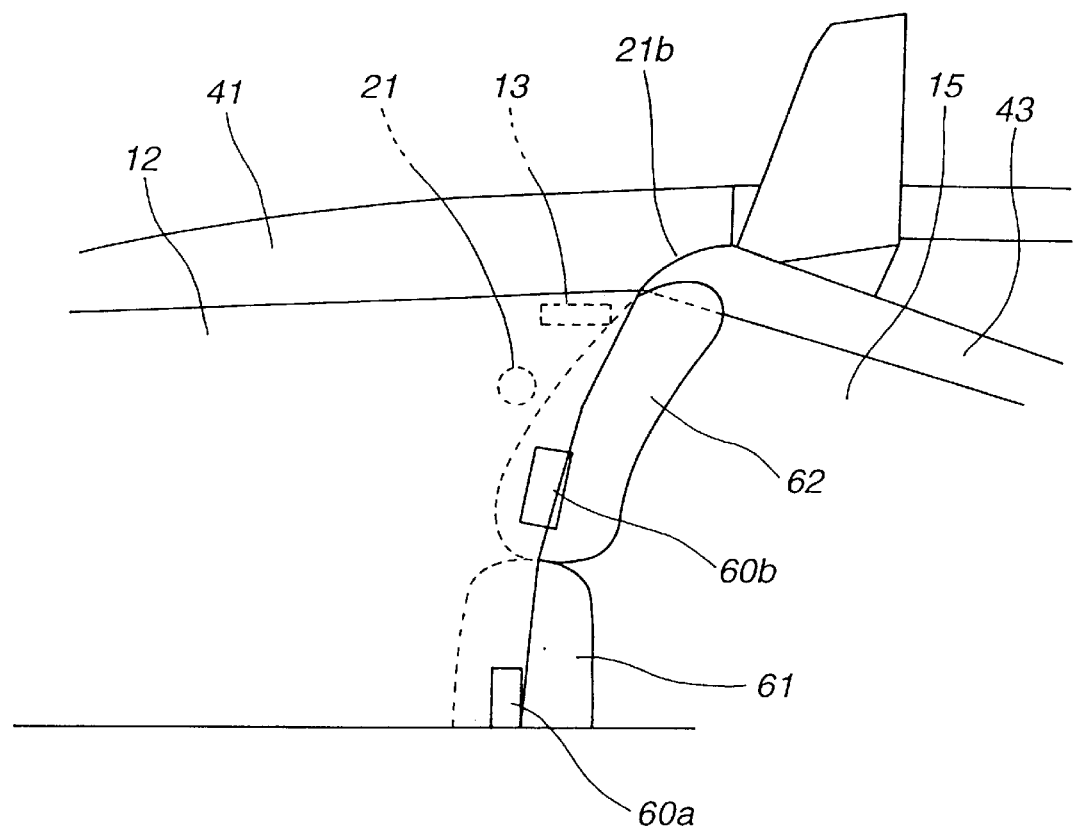
FIG. 31 illustrates diagrammatically a front right half portion of a motor vehicle equipped with a sixth embodiment of an impact reducing device.
Figure 32:
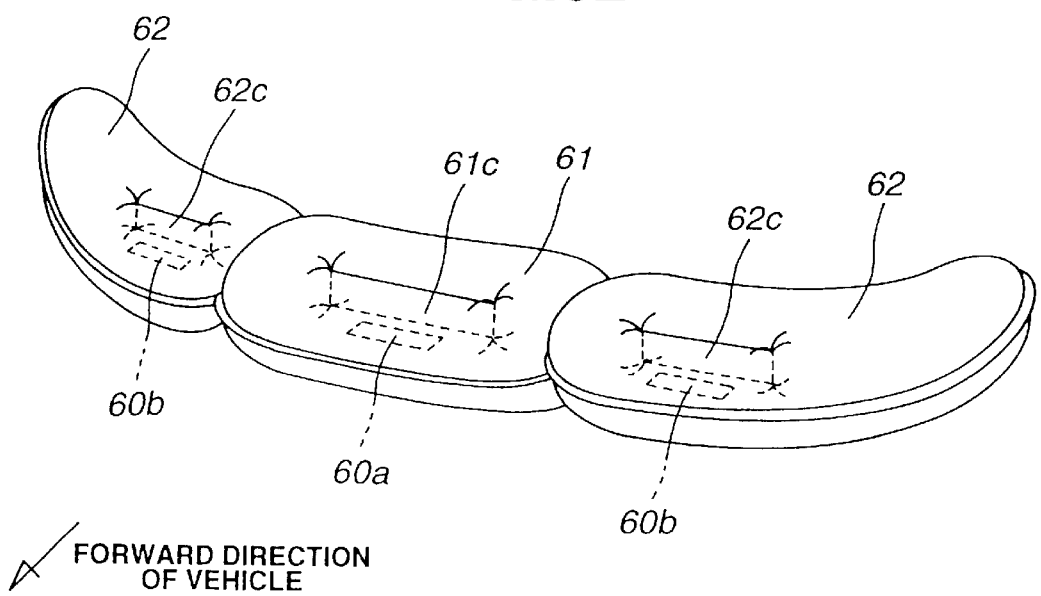
FIG. 32 illustrates, in a perspective view, an air bag used in FIG. 31, which includes and is divided into three air bag segments.

Referring to FIGS. 31 and 32, this sixth embodiment is substantially the same as the second embodiment except the configuration of an air bag. In each of the previously described embodiments, the air bag of the single piece type has been used. According to the sixth embodiment, an air bag includes and divided into a plurality of air bag segments. Specifically, the air bag includes a middle segment 61 and two lateral side segments 62 between which the middle segment 61 is disposed. Each of the air bag segments 61 and 62 is less in volume than the air bag 33 of the single piece type. Accordingly small sized air bag modules 60a and 60b may be used. This makes it easy to mount them to an engine compartment underneath a hood 12. Mount sites or spaces may be easy to find under the hood 12. The middle air bag segment 61 has a restriction member in the form of a partition wall 61c that divides the interior into two chambers. Each of the lateral side air bag segments 62 has a restriction member in the form of a partition wall 62c that divides the interior into two chambers. The air bag segments 61 and 62 are easy and quick to expand into their designed inflated configurations because each air bag segment has a small volume. When they are inflated, each of the air bag segment has a first cushion portion defining one of the two chambers and a second cushion portion defining the other of the two chambers. The first cushion portions of the air bag segments 61 and 62 extend underneath the hood 12, and the second cushion portions of the air bag segments 61 and 62 extend over lower portion of a windshield 15 and a base portion of the front pillar 21b. The air bag segments 61 and 62 may have different levels of interior pressure. In this case, different energy absorption performances may be set for middle and two lateral portions across the width of rear portion of the hood 12.

(Seventh Embodiment)

Figure 33:
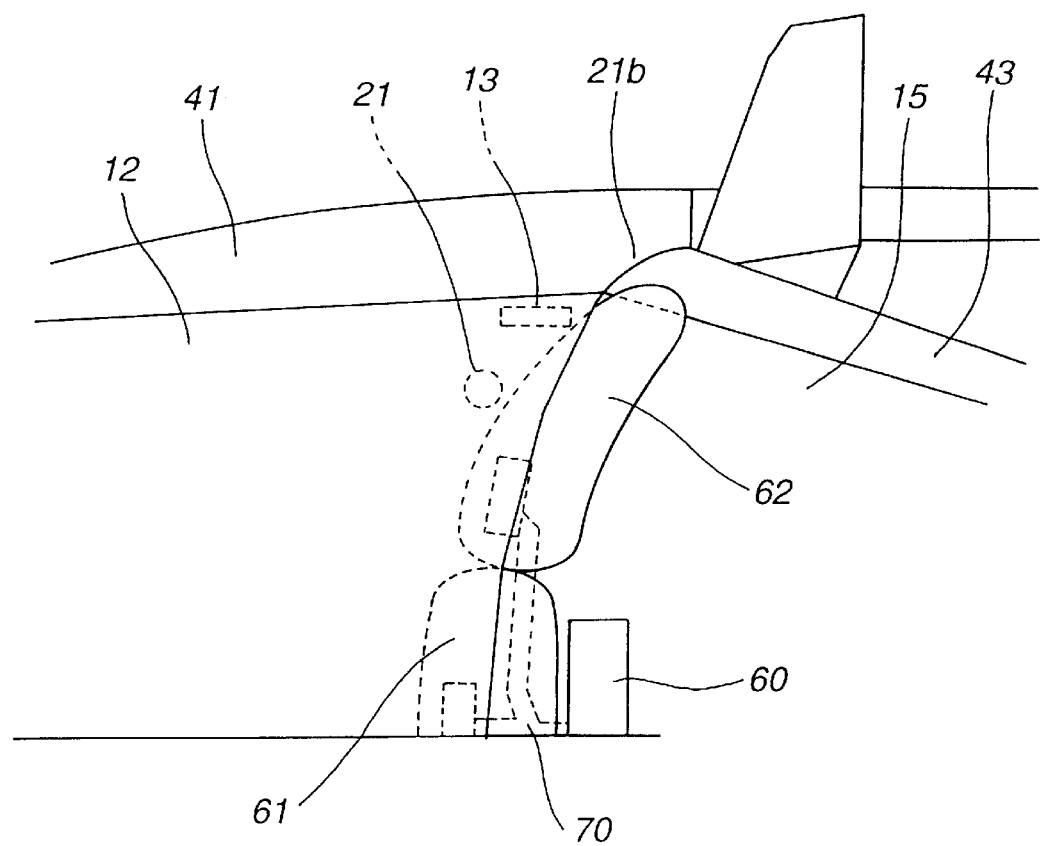
FIG. 33 illustrates diagrammatically a front right half portion of a motor vehicle equipped with a seventh embodiment of an impact reducing device.

Referring to FIG. 33, this seventh embodiment is substantially the same as the sixth embodiment shown in FIGS. 31 and 32 except the use of a distributor 70. The distributor 70 interconnects a gas generator 60 and the air bag segments 61 and 62 for supply of gas to the air bag segments 61 and 62. The use of the distributor 70 allows remote arrangement of the gas generator 60 from the air bag segments 61 and 62, thus providing increased freedom in layout underneath a hood 12.

(Eighth Embodiment)

Figure 34:
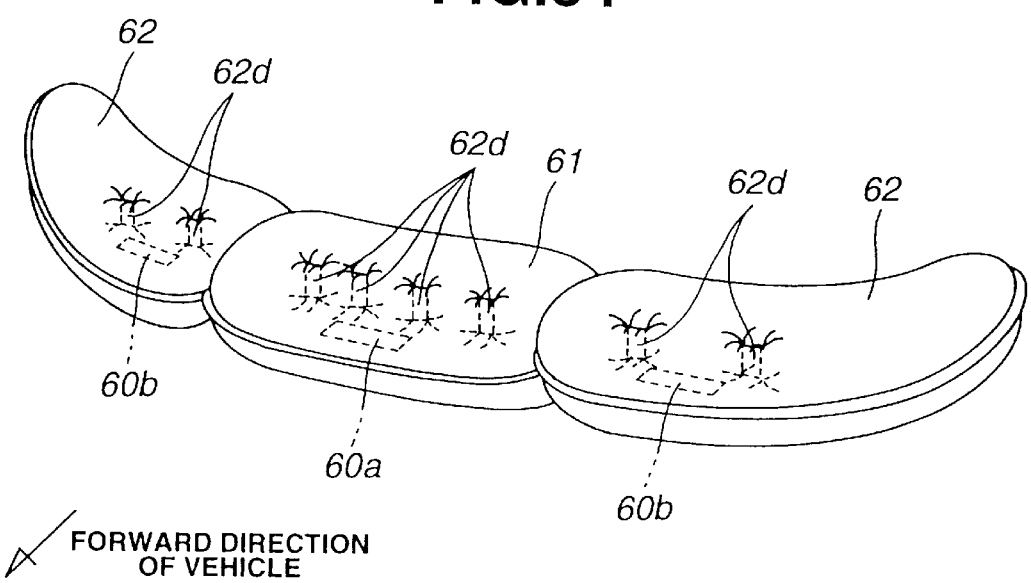
FIG. 34 illustrates, in a perspective view, one example of air bag segments according to eighth embodiment.
Figure 35:
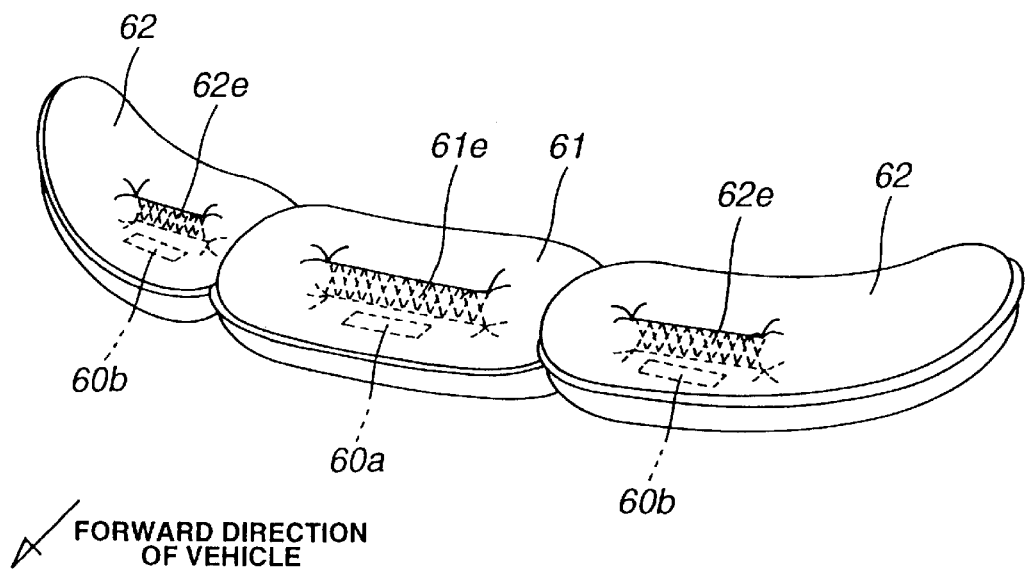
FIG. 35 illustrates, in a perspective view, another example of air bag segments according to the eighth embodiment.

Referring to FIGS. 34 and 35, two examples according to the eighth embodiment are explained. This eighth embodiment is substantially the same as the sixth embodiment shown in FIGS. 31 and 32 except the structure of a constriction member. In the example shown in FIG. 32, the partition walls 61c and 62c are used as the constriction members, respectively. In FIG. 34, string 62d are used as a restriction member of a middle air bag segment 61 and strings 62d as a restriction member of each of two lateral side air bag segments 62. In FIG. 35, a mesh 61e is used as a restriction member of a middle air bag segment 61 and a mesh 62e as a restriction member of each of two lateral side air bag segments 62. Thus use of strings or mesh as restriction members is preferable in providing smooth flow of gas within each of the air bag segments.

(Ninth Embodiment)

Figure 36:
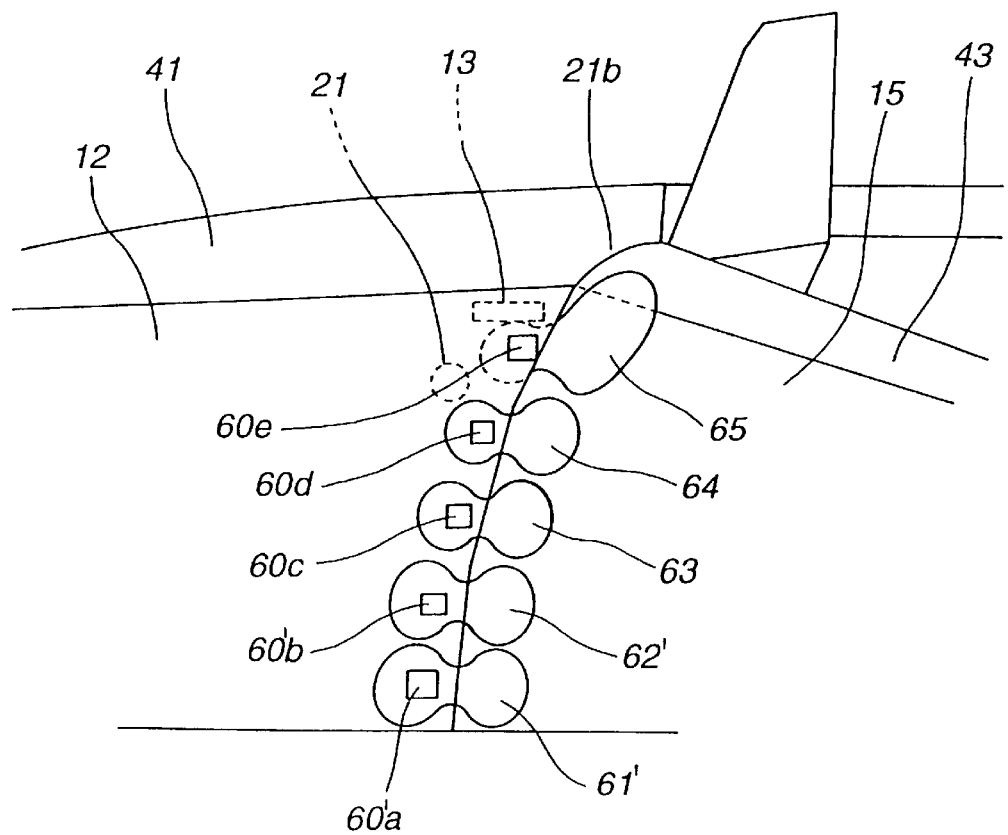
FIG. 36 illustrates diagrammatically a front right half portion of a motor vehicle equipped with a ninth embodiment of an impact reducing device, which uses gourd-shaped air bag segments.
Figure 37A:
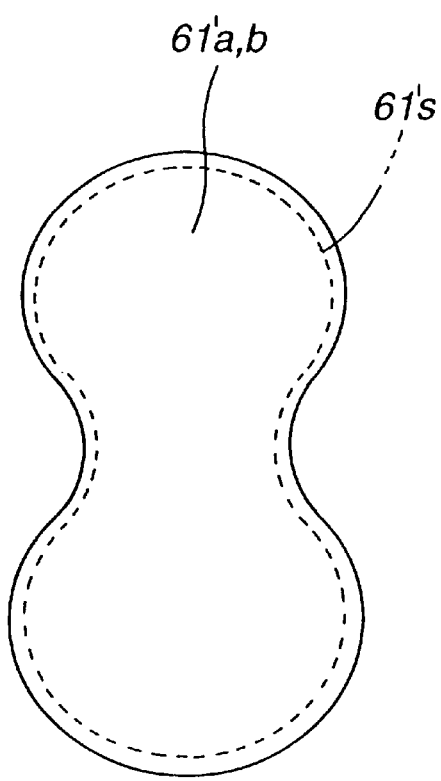
FIG. 37A illustrates, in a plan view, a gourd-shaped air bag segment.
Figure 37B:
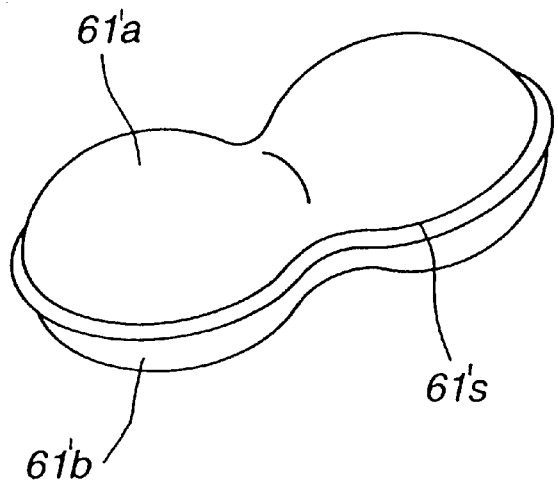
FIG. 37B illustrates, in a perspective view, the gourd-shaped air bag segment.

Referring to FIGS. 36, 37A and 37B, this ninth embodiment is substantially the same as the sixth, seven, and $8^{th}$ embodiments as shown in FIGS. 32, 34 and 35 except the use of a number of gourd-shaped air bag segments 61', 62', 63, 64 and 65. As different from the three air bag segments 61 and 62, each of the gourd-shaped air bag segments 61 does not require such a partition wall 61c or 62c (see FIG. 32), strings 62d (see FIG. 34) and meshes 61e or 62e 20 (see FIG. 35). In FIG. 36, the reference numerals 60'a, 60'b, and 60c to 60e designate air bag modules, respectively. Referring to FIGS. 37A and 37B, each gourd-shaped air bag segment includes an upper wall 61'a and a lower wall 61'b joined to each other by stitching along a line 61's.

The contents of disclosure of Japanese Patent Applications No. 10-180958 (filed Jun. 26, 1999) is hereby incorporated by reference in its entirety.

Each of the above-described implementations of the present invention is an example implementation. Moreover various modifications to the present invention may occur to those skilled in the art and will fall within the scope of the present invention as set forth below.

What is claimed is:

1. A device for reducing impact to a pedestrian involved in interference with a motor vehicle having a hood extending in a generally horizontal plane and covering a compartment in front of a windshield of the vehicle, comprising:

a displacement mechanism for the displacement of the hood from a rest position to an impact position raised relative to the rest position; and an air bag module including an air bag, said air bag module being operative in cooperation with said displacement mechanism to inflate the air bag, causing the air bag to have a first cushion portion extending beneath the rear of the hood across at most the entire width of the hood and a second cushion portion extending out from the rear of the hood; and wherein, when said air bag is inflated, the air bag is restricted in vertical expansion at a restriction portion between said first and second cushion Portions and has a first chamber and a second chamber;

wherein, when the air bag is inflated, the first cushion portion of the air bag includes the first chamber and the second cushion portion of said air bag includes the second chamber; and wherein the air bag includes a restriction member interconnecting two vertically spaced walls at the restriction portion to restrict vertical expansion when said air bag is inflated.

2. The device as claimed in claim 1, wherein said displacement mechanism includes actuator means operative to push the rear of said hood toward the impact position.

3. The device as claimed in claim 2, further comprising:

a sensor to generate a sensor signal upon collision of a pedestrian with the motor vehicle; and a controller operative upon receiving said sensor signal to determine whether or not the hood is to be raised to the impact position and to generate an actuator activation signal, said controller being operative to apply said activation signal to said actuators of said displacement mechanism, causing said actuators to push said hood to the impact position, said controller being operative to apply an air bag module activation signal to said air bag module after the activation of said actuator means of said displacement mechanism, causing said air bag module to inflate said air bag.

4. The device as claimed in claim 2, wherein said actuator means include a pair of actuators mounted near lateral sides of the hood, respectively, in symmetrical relation about a longitudinal centerline of the motor vehicle.

5. The device as claimed in claim 1, wherein, when said air bag is inflated, said restriction portion is less in vertical dimension than the other portion is.

6. The device as claimed in claim 1, wherein, when said air bag is inflated, said restriction portion is disposed between said first and second chambers, and wherein said first chamber extends underneath the hood and said second chamber extends out in a rearward direction from the rear of the hood.

7. The device as claimed in claim 1, wherein said displacement mechanism includes retainers to hold the hood after having been displaced from the rest position to the impact position.

8. The device as claimed in claim 1, wherein the first cushion portion of said air bag extends underneath the hood in a forward direction of the motor vehicle by the same length over the entire width of the hood.

9. A device for reducing impact to a pedestrian involved in interference with a motor vehicle having a hood extending in a generally horizontal plane and covering a compartment in front of a windshield of the vehicle. comprising:

a displacement mechanism for the displacement of the hood from a rest position to an impact position raised relative to the rest position; and an air bag module including an air bag, said air bag module being operative in cooperation with said displacement mechanism to inflate the air bag, causing the air bag to have a first cushion portion extending beneath the rear of the hood across at most the entire width of the hood and a second cushion portion extending out from the rear of the hood;

wherein the first cushion portion of said air bag extends underneath the hood less in a forward direction of the motor vehicle toward lateral sides of the hood.

10. The device as claimed in claim 9, wherein, when said air bag is inflated, said second cushion portion has protrusions from lateral ends thereof, said protrusions extend in a forward direction of the motor vehicle.

11. The device as claimed in claim 9, wherein, when said air bag is inflated, said second cushion portion has protrusions from lateral ends thereof, said protrusions extend in a rearward direction of the motor vehicle.

12. The device as claimed in claim 9, wherein, when said air bag is inflated, said second cushion portion has protrusions from lateral ends thereof, said protrusions extend in a forward direction of the motor vehicle and also in a rearward direction of the motor vehicle.

13. The device as claimed in claim 9, wherein said air bag includes and is divided into a plurality of air bag segments.

14. The device as claimed in claim 13, wherein said air bag module includes a distributor for distributing inflating gas between said plurality of air bag segments.

15. The device as claimed in claim 13, wherein each of said air bag segments is a gourd-shaped air bag segment.

16. A device for reducing impact to a pedestrian involved in interference with a motor vehicle having a hood extending in a generally horizontal plane and covering a compartment in front of a windshield of the vehicle, comprising:

a displacement mechanism for the displacement of the hood from a rest position to an impact position raised relative to the rest position; and an air bag module including an air bag, said air bag module being operative in cooperation with said displacement mechanism to inflate the air bag, causing the air bag to have a first cushion portion extending beneath the rear of the hood across at most the entire width of the hood and a second cushion portion extending out from the rear of the hood;

wherein said air bag includes and is divided into a plurality of air bag segments; and wherein each of said air bag segments include a restriction member interconnecting two vertically spaced walls to restrict vertical expansion at a predetermined portion when said each air bag fragment is inflated to facilitate expansion of said first cushion portion.

17. The device as claimed in claim 16, wherein said restriction member includes a partition wall.

18. The device as claimed in claim 16, wherein said restriction member includes strings.

19. The device as claimed in claim 16, wherein said restriction member includes meshes.

20. A device for reducing impact to a pedestrian involved in interference with a motor vehicle having a hood extending in a generally horizontal plane and covering a compartment in front of a windshield of the vehicle, comprising:

means for generating a signal upon collision of a pedestrian with the motor vehicle;

means for displacing the hood from a rest position to a impact position raised relative to the rest position in response to said signal; and an air bag module under the hood, said air bag module including a gas generator and an inflatable air bag, said air bag module being operative in response to the displacement of the hood from the rest position to the impact position to admit gas to said air bag, inflating the air bag to deploy a first cushion portion beneath the rear of the hood across at most the entire width of the hood and to deploy a second cushion portion out from the rear of the hood to extend over the windshield.

21. A process for reducing impact to a pedestrian involved in interference with a motor vehicle having a hood extending in a generally horizontal plane and covering a compartment in front of a windshield of the vehicle, comprising:

generating a signal upon collision of a pedestrian with the motor vehicle;

raising the hood from a rest position to an impact position in response to said signal; and inflating an air bag after the hood has been raised from the rest position to the impact position to deploy a first cushion portion beneath the rear of the hood across at most the entire width of the hood and to deploy a second cushion portion out from the rear of the hood to extend over the windshield.

* * * * *